(12) United States Patent
Dickie et al.

(10) Patent No.: US 9,131,712 B2
(45) Date of Patent: Sep. 15, 2015

(54) TURKEY BLANKET/LIFTER

(75) Inventors: Robert G. Dickie, King City (CA); Adeline Nelson, King City (CA)

(73) Assignee: Kitchen Innovations Inc., King City, Ontario (CA)

( * ) Notice: Subject to any disclaimer, the term of this patent is extended or adjusted under 35 U.S.C. 154(b) by 524 days.

(21) Appl. No.: 12/831,536

(22) Filed: Jul. 7, 2010

(65) Prior Publication Data

US 2012/0009316 A1   Jan. 12, 2012

(51) Int. Cl.
| A22C 7/00 | (2006.01) |
| A23P 1/00 | (2006.01) |
| A47J 43/18 | (2006.01) |
| A47J 37/10 | (2006.01) |
| A47J 27/00 | (2006.01) |
| A47J 37/07 | (2006.01) |
| A23L 1/01 | (2006.01) |
| A23B 4/10 | (2006.01) |
| A47J 37/04 | (2006.01) |
| A47J 37/06 | (2006.01) |
| B65D 30/20 | (2006.01) |

(52) U.S. Cl.
CPC ............... *A23L 1/0128* (2013.01); *A23B 4/10* (2013.01); *A47J 37/049* (2013.01); *A47J 43/18* (2013.01); *A47J 37/0694* (2013.01); *A47J 37/0763* (2013.01); *A47J 37/0786* (2013.01); *A47J 37/10* (2013.01); *B65D 31/10* (2013.01)

(58) Field of Classification Search
CPC ..... A47J 27/10; A47J 37/0694; A47J 37/106; A47J 37/10; A47J 37/0704; A47J 37/0786; A47J 37/0763; A47J 37/044; B65D 25/16; B65D 25/14; B65D 31/10; B65D 65/12; A21B 3/13; A21B 5/026; A23F 5/206

USPC ........... 99/426, 347, 422, 432, 425, 446, 444, 99/400, 449; 426/389, 523, 478; 220/573.4, 573.5, 495.03, 495.01; 383/120; 229/87.03

See application file for complete search history.

(56) References Cited

U.S. PATENT DOCUMENTS

| 1,704,175 A | * | 3/1929 | Coale | 229/5.82 |
| 2,047,914 A | * | 7/1936 | Lifton | 190/109 |
| 2,649,379 A | * | 8/1953 | Woods | 426/393 |
| 2,848,336 A | * | 8/1958 | Cage | 426/126 |
| 2,865,768 A | * | 12/1958 | Barnes et al. | 426/111 |
| 2,970,736 A | * | 2/1961 | Baughan | 229/123.1 |
| 3,032,249 A | * | 5/1962 | Kollar et al. | 220/672 |

(Continued)

FOREIGN PATENT DOCUMENTS

WO   02065027   8/2002

*Primary Examiner* — Dana Ross
*Assistant Examiner* — Hemant Mathew
(74) *Attorney, Agent, or Firm* — Sand & Sebolt

(57) ABSTRACT

A cooking aid and methods of manufacturing and using the same are disclosed. The cooking aid includes a piece of foil for wrapping around a turkey or other fowl or food to serve as a cooking blanket to retain heat and moisture, and also serve as a lifter for lifting the fowl out of a roasting pan. The foil typically includes one or more pleated sections having panels folded along longitudinal folds which may be unfolded to expand the piece of foil. The foil may include left and right pleated sections with a central section of the foil therebetween. Drain holes are typically formed in the central section, which may also be embossed with logos or the like. Axial sections of the foil may be folded at an axial fold to overlay one another. Portions of the foil may be formed into rolled handles to help lift the fowl.

23 Claims, 21 Drawing Sheets

(56) References Cited

U.S. PATENT DOCUMENTS

| | | | |
|---|---|---|---|
| 3,078,895 A * | 2/1963 | Silver | 383/7 |
| 3,155,304 A * | 11/1964 | Beerend | 229/186 |
| 3,323,442 A * | 6/1967 | Rader | 99/347 |
| 3,324,917 A * | 6/1967 | Schirtzinger | 220/666 |
| 3,333,523 A * | 8/1967 | Terzuoli | 493/197 |
| 3,415,662 A * | 12/1968 | Koger et al. | 426/113 |
| 3,495,762 A * | 2/1970 | Verbic | 383/120 |
| 3,578,239 A * | 5/1971 | Perlman | 206/521 |
| 3,670,953 A * | 6/1972 | Leventhal | 383/109 |
| 3,670,954 A * | 6/1972 | Leventhal | 383/109 |
| 3,730,076 A * | 5/1973 | Levin | 99/347 |
| 3,917,155 A * | 11/1975 | Bemiss | 229/169 |
| 4,320,699 A * | 3/1982 | Binks | 99/349 |
| 4,526,565 A * | 7/1985 | Hummel et al. | 493/196 |
| 4,795,648 A * | 1/1989 | Capy et al. | 426/111 |
| 4,981,588 A * | 1/1991 | Poulallion | 210/474 |
| 5,580,625 A * | 12/1996 | Capy et al. | 428/35.2 |
| 5,654,075 A * | 8/1997 | Ramirez | 428/130 |
| 5,720,427 A * | 2/1998 | Kachel et al. | 229/67.3 |
| 5,721,022 A * | 2/1998 | Morita et al. | 428/34.2 |
| 5,890,810 A * | 4/1999 | Barlow | 383/120 |
| 7,364,762 B2 * | 4/2008 | Unwin | 426/107 |
| 7,523,854 B2 * | 4/2009 | Gray | 229/114 |
| 7,647,866 B2 * | 1/2010 | Button | 99/422 |
| 8,245,634 B1 * | 8/2012 | Maiaro et al. | 99/450 |
| 2002/0112614 A1 * | 8/2002 | Zoss | 99/426 |
| 2004/0022456 A1 * | 2/2004 | Hanson | 383/8 |
| 2007/0163449 A1 * | 7/2007 | Hart | 99/426 |
| 2008/0087268 A1 * | 4/2008 | Burton | 126/9 R |
| 2008/0135039 A1 * | 6/2008 | Sharpe | 126/25 R |

* cited by examiner

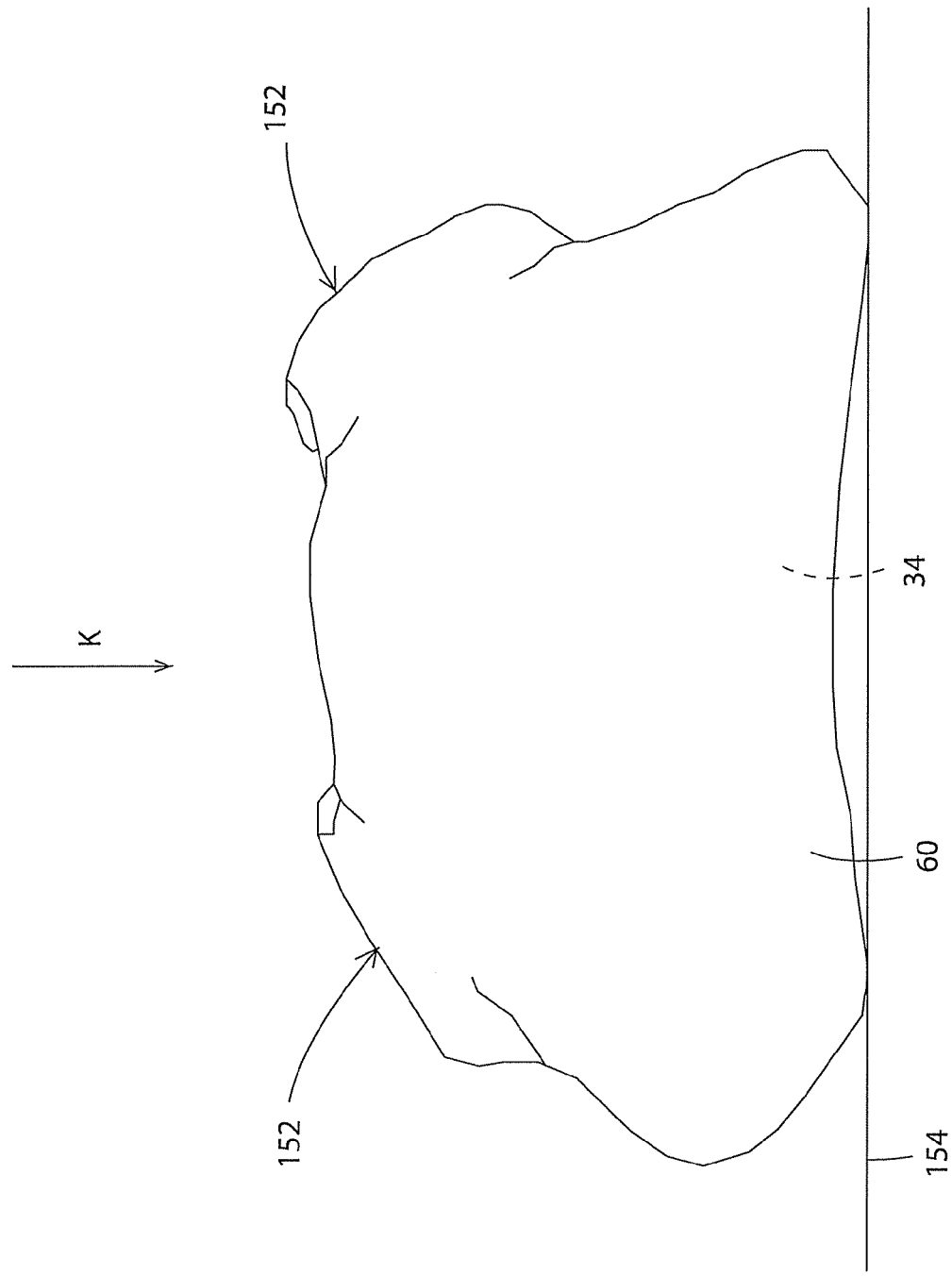

US 9,131,712 B2

TURKEY BLANKET/LIFTER

BACKGROUND OF THE INVENTION

1. Technical Field

The present invention relates to a cooking aid and the method of using the same for cooking in a standard oven. More particularly, the present invention relates to a cooking blanket and lifter for a turkey or other fowl or food to aid in cooking as well as lifting the fowl or other food out of a cooking pan. Specifically, the present invention relates to such a blanket and lifter which is formed of foil.

2. Background Information

A variety of methods are known for cooking turkeys and other relatively large fowl. One method recommends cooking the turkey in an oven uncovered while basting the turkey frequently. Many cooks add blankets such as foil to help retain the heat and moisture in the turkey. Pan liners are also available for cooking turkeys to minimize the mess which typically results to the baking pan. In addition, a lifter may be used within the roasting pan so that the turkey roasted thereon may be lifted out of the pan in one piece. However, such lifters are typically not easy to use. The lifting process often leaves messy fluids on the counter and floor. Thus, there is a need in the art for a lifter and blanket which is inexpensive, easy to use and eliminates various problems with the prior art.

BRIEF SUMMARY OF THE INVENTION

The present invention provides a cooking aid comprising a foil body having front and back edges defining therebetween a longitudinal direction and left and right edges defining therebetween an axial direction; wherein the foil body is adapted for use in cooking food in an oven; a central section of the foil body; a left section of the foil body; a right section of the foil body; and a plurality of panels folded along longitudinal folds in at least one of the sections of the foil body so that the at least one section is expandable from a folded position to an unfolded position.

The present invention also provides a method comprising the steps of placing a foil body in a roasting pan; putting food in the pan atop the foil body; unfolding a first pleated section of the foil body to expand the pleated section upwardly along a first side of the food; and cooking the food on the foil body in the pan.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

FIG. 23 is a side elevational view of the blanket wrapped around the turkey and lowered onto a counter, cutting board or the like.

Similar numbers refer to similar parts throughout the drawings.

DETAILED DESCRIPTION OF THE INVENTION

Figure 1:
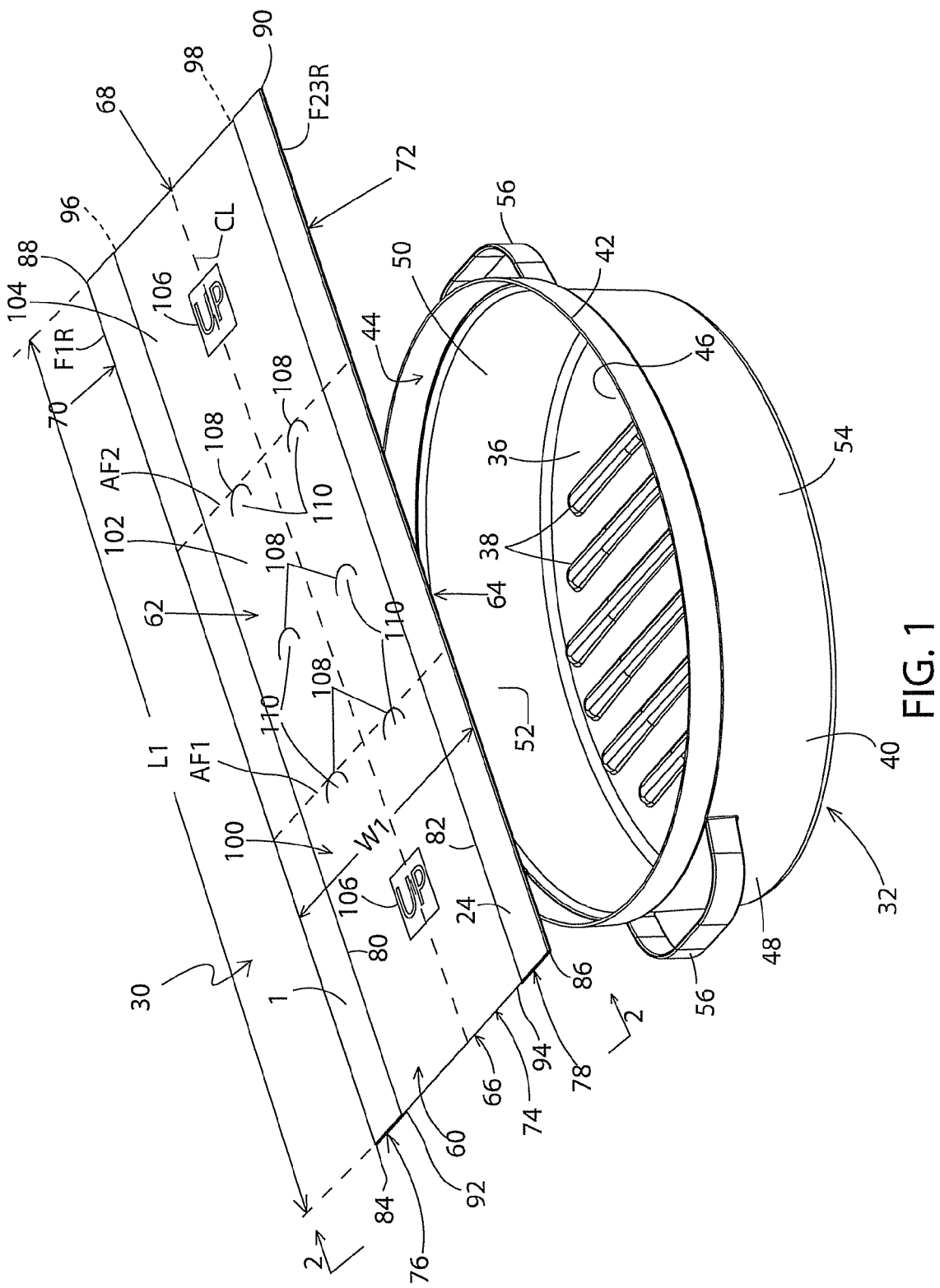
FIG. 1 is a perspective view showing the turkey blanket/lifter of the present invention above a roasting pan.

The cooking aid of the present invention is shown generally at 30 in FIG. 1 and is used inside a baking or roasting pan 32 as an aid to cooking relatively large fowl such as a turkey 34 (FIG. 18) or other food. Cooking aid 30 is in the form of a cooking blanket and lifter which facilitates the cooking of the turkey or other food as well as the lifting of the turkey or other food out of the pan 32. For brevity, cooking aid 30 will hereafter typically be referred to simply as blanket 30.

Before providing the details of blanket 30, pan 32 will be described briefly. Pan 32 includes a bottom wall 36 typically having a flat section and a plurality of strengthening ribs 38 extending upwardly therefrom. An annular side wall 40 is secured at its bottom end to the outer perimeter of bottom wall 36 and extends upwardly therefrom to an annular top edge 42 which defines a top entrance opening 44 of an interior chamber 46 defined by bottom wall 36 and side wall 40. Side wall 40 includes a front wall 48, a back wall 50, and left and right walls 52 and 54. A pair of rigid handles 56 are respectively secured to walls 48 and 50 on opposite ends of the pan. Pan 32 is typically a rigid structure formed primarily of metal.

Figure 6:
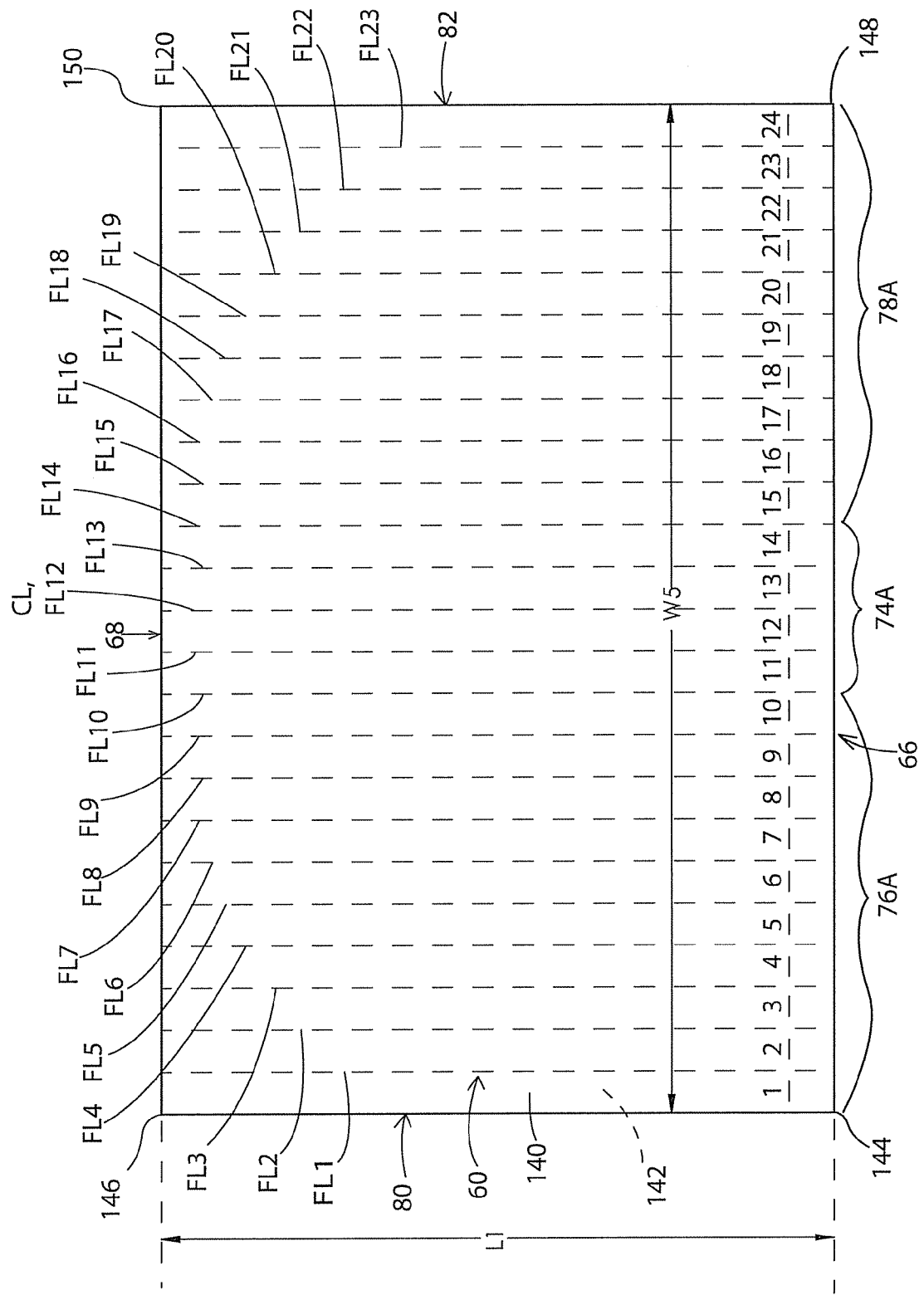
FIG. 6 is a top plan view of the piece of foil from which the turkey blanket is formed.
Figure 7:
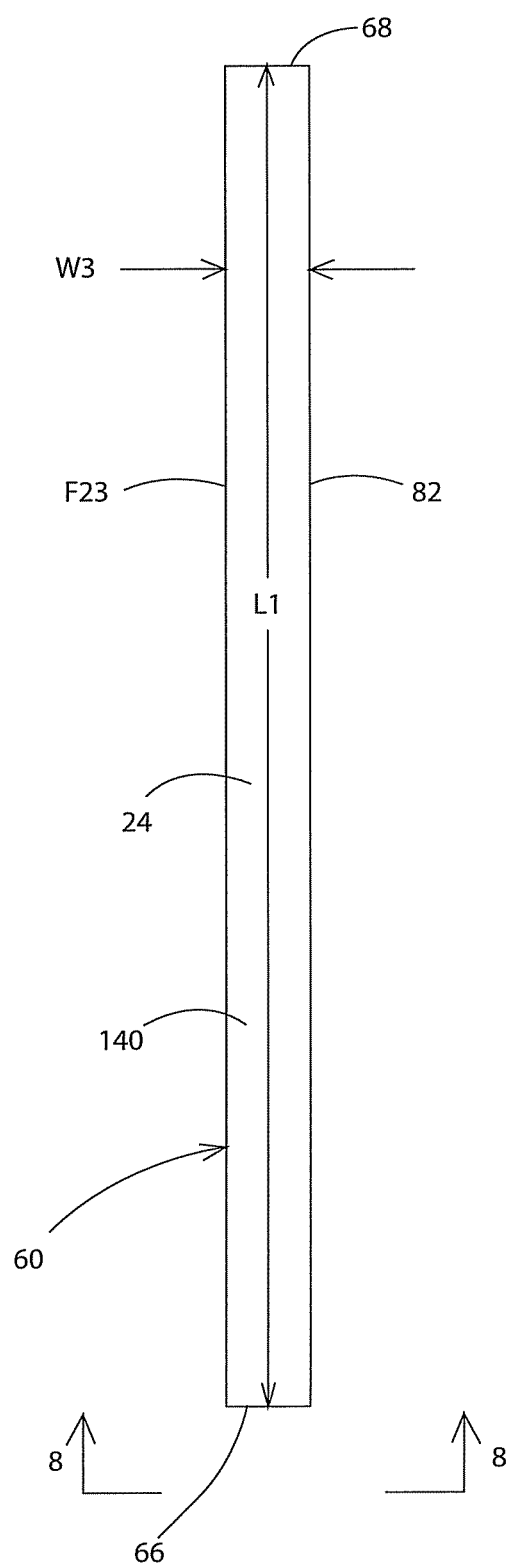
FIG. 7 is a top plan view of the piece of foil of FIG. 6 after it has been fully pleated.

Blanket 30 is shown in FIG. 1 in a partially expanded and partially collapsed position as it would typically be prior to insertion into pan 32. Blanket 30 also has a fully collapsed position illustrated in dashed lines in FIG. 4, from which it may be unfolded to the position of FIG. 1. Blanket 30 is now described in the position shown primarily in FIGS. 1-3. Blanket 30 is formed of a single unitary sheet or piece 60 of foil, or foil body, which is most typically aluminum foil although other metals may be used where such metals are suitable for cooking and within cost parameters. Blanket 30 in the position of FIG. 1 is substantially flat and horizontal and is rectangular as viewed from above. In the exemplary embodiment, the foil or foil body has a thickness between 0.001 to 0.0015 inch. Blanket 30 has parallel front and back edges 66 and 68 which also serve respectively as the front and back edges of the foil body or piece 60 of foil. Front and back edges 66 and 68 define therebetween a longitudinal direction of blanket 30 and piece 60. Blanket 30 has left and right opposed side edges 70 and 72 which are perpendicular to front and back edges 66 and 68 and which define therebetween an axial direction of blanket 30 and piece 60. Blanket 30 has a longitudinally extending center line CL which is parallel to and midway between edges 70 and 72. Center line CL is also the center line of piece 60 of foil before it is folded to form blanket 30, as shown in FIG. 6.

Figure 3:
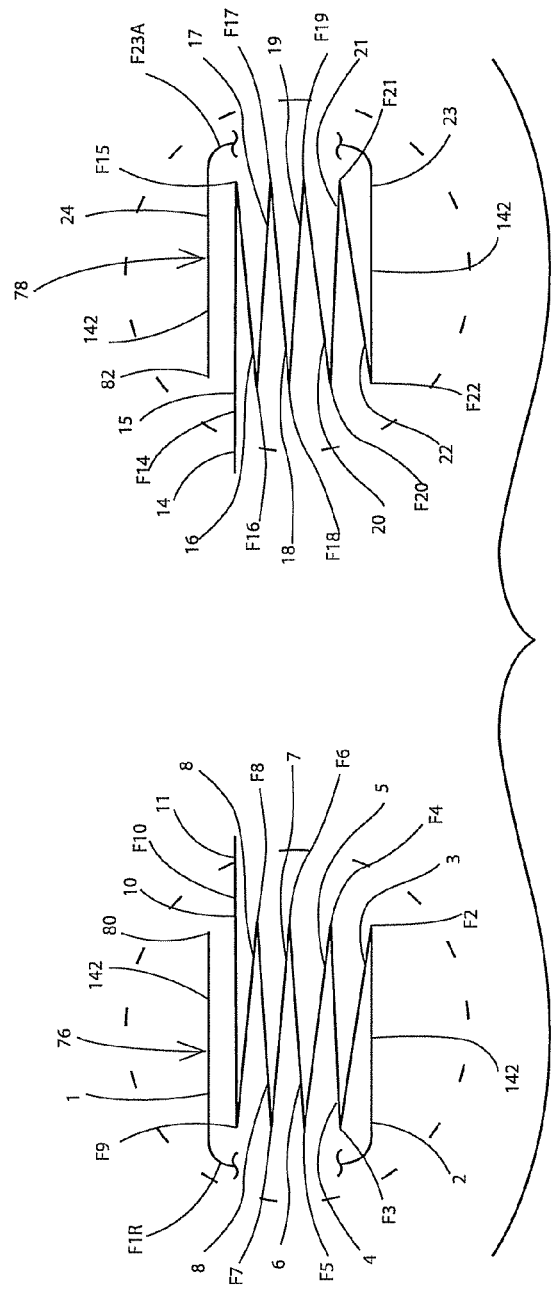
FIG. 3 is an enlarged view of the encircled portions of FIG. 2 with the left and right pleated sections shown partially expanded.

Blanket 30 includes a central longitudinal section 74 which is formed of a single thickness or single ply of the foil body or piece 60 of foil, which is rectangular as viewed from above and which extends from front edge 66 to back edge 68. Center line CL bisects central section 74 as well as blanket 30 and piece 66. Blanket 30 also includes left and right pleated sections 76 and 78 with left section 76 connected to the left edge of central section 74 and extending to the left therefrom and right section 78 connected to the right edge of central section 74 and extending to the right therefrom. Each of pleated sections 76 and 78 are formed of multiple thicknesses or plies of piece 60 inasmuch as multiple longitudinally elongated panels of the section 76 or 78 are folded back and forth on one another, as best illustrated in FIG. 3, which shows the pleated sections in a partially expanded configuration for purposes of illustration. Each of sections 76 and 78 extend from front edge 66 to back edge 68. In the exemplary embodiment, left pleated section 76 is formed of panels 1-10 which are folded back and forth respectively at folds F1R and F2-F9 (FIG. 3). Similarly, right section 78 is formed of panels 15-24 which are folded back and forth on one another at folds F15-F22 and F23R. Folds F1R and F23R are numbered differently from the other folds inasmuch they are reverse folds relative to the pattern otherwise established by the remaining folds noted above, as will be discussed further below.

Figure 2:
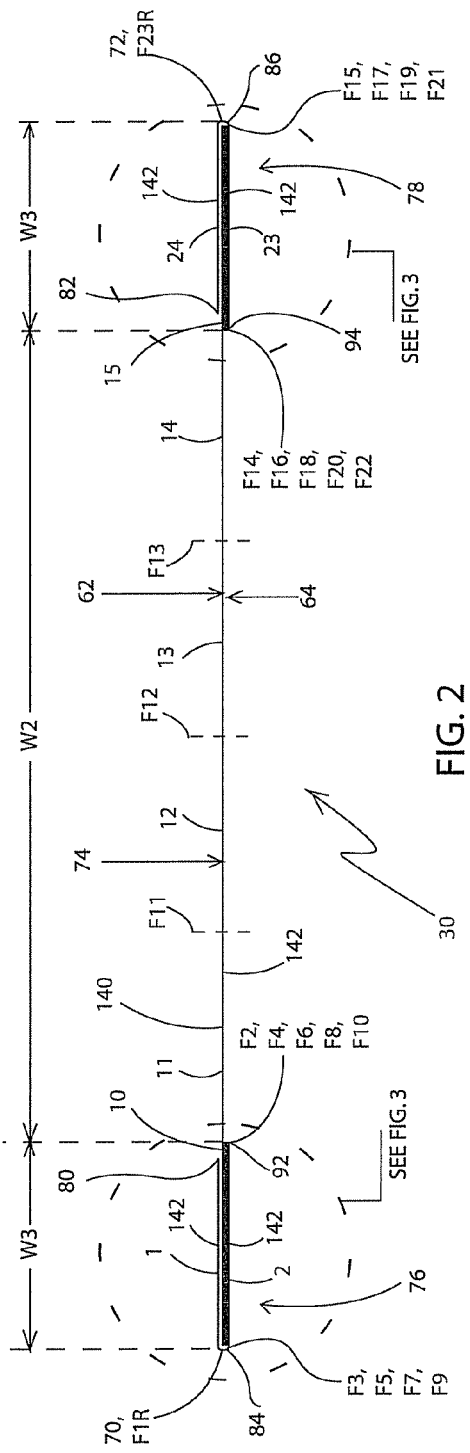
FIG. 2 is a front end elevational view of the blanket taken on line 2-2 of FIG. 1.

Although not illustrated in FIG. 1, central section 74 may also be formed from similar panels such as panels 11-14 shown in FIG. 2 which have been unfolded into the flat configuration of panel 74. Each of panels 1-24 is formed of a single thickness or ply of piece 60, extends from front edge 66 to back edge of 66 and is rectangular as viewed from above. In the configuration of FIGS. 1 and 2, each of panels 1-24 is substantially flat and horizontal, as is each of sections 74, 76, and 78. Blanket 30 is thus substantially flat and horizontal in this configuration although pleated section 76 and 78 are thicker than central section 74 by a factor which is at least the number of panels within the given pleated section. In the exemplary embodiment, each pleated section includes 10 of the panels so that the given pleated section has a thickness which is about ten times that of central section 74 when the pleated section is fully flattened or collapsed with each of the panels therein horizontal and thus parallel to one another.

Left pleated section 76 is formed so that panel 2 is the bottom panel of the left pleated section and the remainder of the panels therein are directly above and aligned with panel 2. More particularly, panel 3 is the next panel directly above panel 2 with panel 4 being the next panel directly above panel 3 and so forth up to panel 10. Panel 1 serves as the top panel directly above panel 10. As shown in FIG. 3, the right edges of panels 2 and 3 are connected at longitudinal fold F2. Likewise, the right edges of panels 4 and 5 are connected at right fold F4, the right ends of panels 6 and 7 are connected at right fold F6 and panels 8 and 9 are connected at right fold F8. Thus, folds F2, F4, F6, and F8 are the right folds of left pleated section 76 and are all parallel longitudinally extending folds which are directly above one another and extend from front edge 66 to back edge 68. Each of the right folds are closely adjacent or abutting one another when the pleated section 76 is fully collapsed. The left edges of panels 3 and 4 are connected at left longitudinal fold F3, the left edges of panels 5 and 6 are connected at left fold F5, the left edges of panels 7 and 8 are connected at left fold F7, and the left edges of panels 9 and 10 are connected at left fold F9. Thus, left pleated section 76 has a series of left folds F3, F5, F7, and F9 which are parallel to the right folds and to one another, which are vertically aligned one above the other and which extend from front edge 66 to back edge 68. The left folds are likewise closely adjacent or abutting one another in the fully collapsed position of left pleated section 76.

If the back and forth pattern of the folds F2-F9 were repeated with respect to panels 1 and 2, panel 1 would be directly under and adjacent panel 2. However, the left edges of panels 1 and 2 are connected at reverse fold F1R so that panel 1 is folded upwardly and over panel 2 instead of downwardly and under panel 2. Fold F1R is another of the left folds of pleated section 76 which is adjacent the other left folds. However, fold F1R extends from the left edge of panel 2 upwardly past left folds F3, F5, F7, and F9 and directly over fold F9 so that panel 1 lies flat above panel 10 so that panel 1 is closely adjacent or abutting panel 10 in the fully collapsed position. Thus, fold F1R is to the left of and closely adjacent or abutting the other left folds of section 76. In the fully collapsed position of pleated section 76, panel 1 has a right longitudinal edge 80 which is above and slightly to the left of the right edges or right folds of pleated section 76 inasmuch as each of the panels have the same width and a portion of panel 1 along its left edge is used in forming the fold F1R in order to extend around the other left folds of section 76. Right edge 80 also serves as the left edge of piece 60 of foil when piece 60 is flat prior to the forming process, as shown in FIG. 6.

Right pleated section 78 is a mirror image of left pleated section 76 and includes panels 15-24 arranged so that panel 23 is the bottom panel and panel 24 is the top panel of section 78. Right section 78 thus includes left longitudinal folds F16, F18, F20, and F22 which are parallel and vertically aligned and connect respective pairs of the panels of section 78 at their left edges. The left folds of right section 78 thus form a left edge of section 78 which faces and is spaced to the right of the right edge of section 76 formed by the right folds thereof. Right section 78 also includes right folds F15, F17, F19, and F21 which are parallel to all of the other folds and are parallel to and vertically aligned with one another so that they are directly above one another. Right section 78 also includes a right fold F23R which is a reverse fold as discussed with regard to reverse fold F1R of left section 76. Fold F23R thus forms the right edge of right pleated section 78. Folds F1R and F23R respectively define left and right edges 70 and 72 and are thus opposed edges which face away from one another. Fold F23R extends upwardly from the right edge of panel 23 immediately to the right of the other right folds of right section 78 and then leftward around the right fold F15 so that panel 24 is directly above and closely adjacent or abutting panel 15. Panel 24 has a left longitudinal edge 82 which is parallel to all of the folds and to edge 80 of panel 1. Edge 82 is above, adjacent and to the right of the left edge of right section 78 defined by the left folds thereof. Left edge 82 of panel 24 also serves as the right edge of piece 60 in its flat pre-formed configuration of FIG. 6.

In the position of FIG. 1, blanket 30 has a front left corner 84, a front right corner 86, a back left corner 88, and a back right corner 90. Corner 84 is formed by the intersection of the front of left side edge 70 or fold F1R and front edge 66 at the left edges of panels 1 and 2. More broadly, corner 84 is formed by the intersection of the front of the left folds of left section 76 and front edge 66 along the various panels of section 76. Left front corner 84 thus also serves as the left front corner of left pleated section 76. Right front corner 86 is similarly formed by the intersection of right side edge 72 or fold 23R and front edge 66 at the right of panels 23 and 24, or more broadly at the intersection of the other right folds of pleated section 78 and front edge 66 along the various panels thereof. Corner 86 thus serves as the right front corner of right section 78. Back left corner 88 is defined by the intersection of left side edge 70 or fold F1R and back edge 68 at the left of panels 1 and 2 or more broadly the intersection between the left folds of left section 76 and back edge 68 along the respective panels forming the left folds. Corner 88 thus serves as the back left corner of left pleated section 76. Back right corner 90 is defined at the intersection of right side edge 72 or right fold F23R and back edge 68 along the right side of panels 23 and 24 or more broadly between the other right folds of section 78 and back edge 68 along the corresponding panels thereof. Corner 90 thus serves as the back right corner of right pleated section 78.

Left pleated section 76 has a right front corner 92 and a back right corner 96 while right section 78 has a front left corner 94 and a back left corner 98. Front right corner 92 is formed at the intersection of the right edge of left pleated section 76 formed by the right folds thereof and front edge 66 along the corresponding panels which form said right folds. Back right corner 96 is formed at the intersection of the right folds of section 76 and back edge 68 of the panels forming said right folds. Front left corner 94 is formed at the intersection of the left folds of section 78 and front edge 66 along the panels forming said folds. Back left corner 98 is formed at the intersection of the left folds of section 78 and back edge 68 along the panels forming said left folds.

Figure 4:
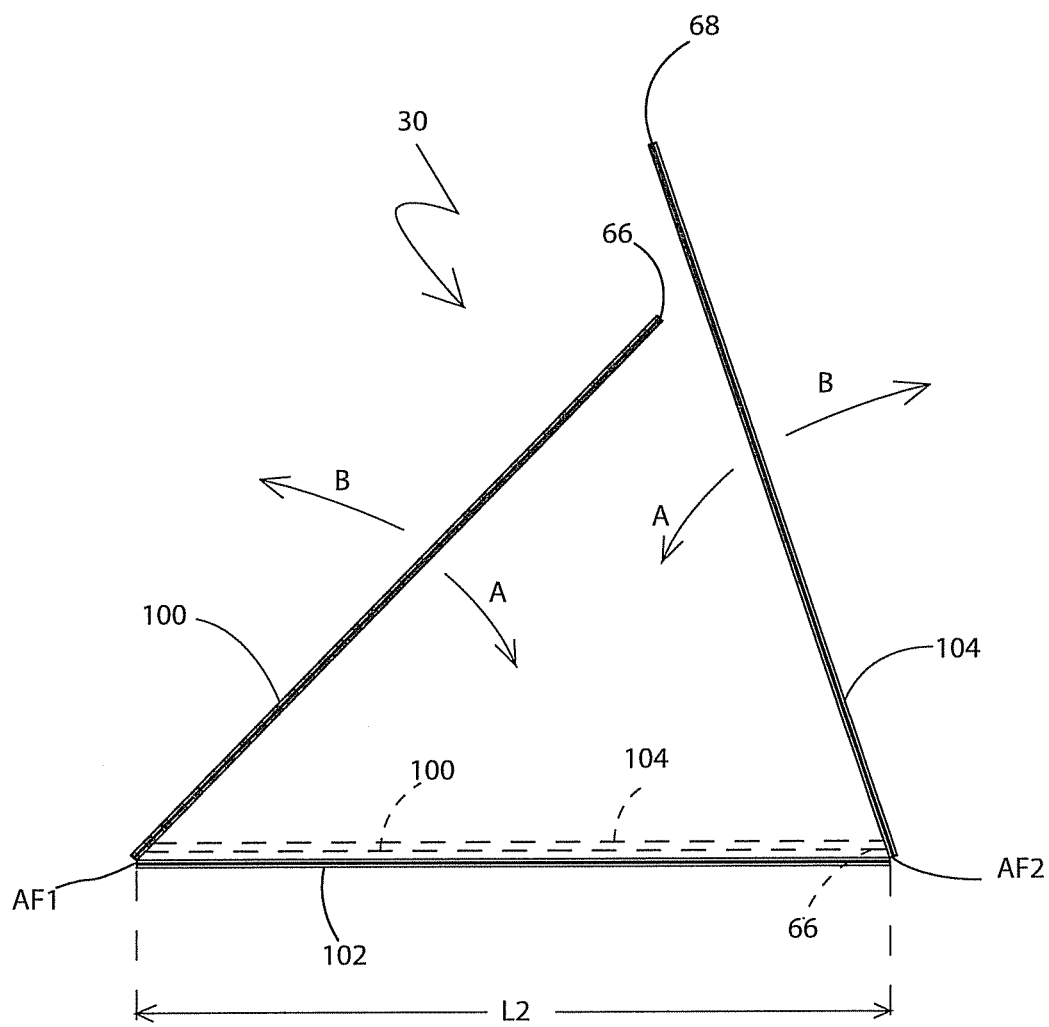
FIG. 4 is a side elevational view of the blanket with dashed lines showing the fully collapsed position of the blanket and solid lines showing the intermediate position between the fully collapsed position and the position shown in FIG. 1.

Blanket 30 further includes a front axial section 100, a middle axial section 102 rearward of section 100 in the position of blanket 30 in FIG. 1, and a back axial section 104 which is rearward of middle section 102 in the position of FIG. 1. Each of sections 100, 102, and 104 extend from left side edge 70 to right side edge 72. Thus, front section 100 includes a front portion of central section 74, a front section of left section 76, and a front section of right section 78. Middle section 102 thus includes respective middle portions of sections 74, 76, and 78. Back section 104 thus includes back portions of sections 74, 76, and 78. The back of front section 100 is connected to the front of middle section 102 at an axial fold line or crease AF1. Likewise, the back of middle section 102 and the front of back section 104 are connected at a second parallel axial fold line or crease AF2. Fold lines AF1 and AF2 extend axially from left edge 70 to right edge 72 parallel to front and back edges 66 and 68 and perpendicular to left and right side edges 70 and 72 and the longitudinal folds. Sections 100, 102, and 104 are approximately the same size and thus each make up about ⅓ of blanket 30 although the longitudinal length of each of these sections may vary somewhat in order to allow them to be folded about fold lines AF1 and AF2 from the position shown at FIG. 1 to the fully collapsed position shown in dashed lines in FIG. 4. More particularly, the fully collapsed position of blanket 30 is illustrated in FIG. 4 with panel 102 in solid lines and panels 100 and 104 in dashed lines. FIG. 4 also illustrates the folding of sections 102 and 104 relative to section 102 toward the fully collapsed position at Arrows A and the unfolding thereof at Arrows B.

As shown in FIG. 1, central section 74 is embossed at two separate locations respectively within front section 100 and back section 104 to form an embossed logo or indicator 106 which includes alphabetical characters or letters which are either raised or recessed relative to the portion of foil immediately adjacent and surrounding the letters. In the exemplary embodiment, the embossed letters 106 spell "UP" to indicate the proper orientation of blanket 30 for its use in cooking the turkey or the like. However, the embossed sections may respectively include a logo which may include a design with or without alphabetical letters and which may be indicative of a seller of blanket 30, for instance, a brand or trade name, a trademark and so forth. Semicircular U-shaped slits 108 are formed in central section 74 and in or adjacent central section 102 such that slits 108 serve as drain holes for allowing various liquids or juices to drain downwardly therethrough, as discussed further below. U-shaped slits 108 extend from the top surface to the bottom surface of piece 60 of foil and define semicircular flaps 110 which may flex or bend relative to the foil immediately adjacent flaps 110 in order to increase the size of the openings or drain holes.

Although the dimensions of blanket 30 may vary depending on the size of the turkey or other fowl to be cooked, the typical dimensions of blanket 30 are now discussed. Front and back edges 66 and 68 define therebetween a longitudinal length L1 which in one embodiment is about 24 inches and typically is within the range of about 18 inches to about 26 inches. Length L1 thus represents the total length of blanket 30 in the position shown in FIG. 1. Length L1 thus also represents the length of each of panels 1-24, each of pleated sections 76 and 78, and central section 74. Side edges 70 and 72 define therebetween an axial width W1 which in the exemplary embodiment is about 9 inches and typically falls within the range of about 6 inches to about 12 inches. As shown in FIG. 2, central section 74 has an axial width W2 and each pleated section has an axial width W3 which is substantially smaller than width W2. Thus, width W1 equals width W2 plus twice width W3.

Width W2 is defined between the right edge 92 or the right folds of left pleated section 76 and left edge 94 or the left folds of right pleated section 78. The width W3 of left section 76 is defined between its left and right edges, respectively represented by fold F1R and edge 92 or the right folds thereof. Where the reverse fold F1R is not used so that panel 1 is not folded around the other panels of left section 76, the left edge of section 76 is defined by the left folds thereof. Similarly, the width W3 of right section 78 is defined between left edge 94 or the left folds thereof and the right edge or fold F23R. Once again, if panel 24 is not folded in a reverse fashion around the other folds of section 78, the right edge is defined by the right folds thereof. In the exemplary embodiment, width W2 is four times W3 although this may vary. In light of the manufacturing process discussed further below, width W3 is a factor of width W2 such that width W2 will be two times width W3, three times width W3, four times width W3 or so forth. In the exemplary embodiment, width W2 is about 6 inches and typically within the range of about 4 inches to about 8 inches. Width W3 in the exemplary embodiment is about 1.5 inches and typically within the range of about 1 inch to about 2 inches. In the exemplary embodiment, length L1 is between two times width W1 and three times width W1 although this may vary. In addition, length L1 is about four times width W2 although this may vary as well. Length L1 is also about sixteen times width W3 although this may vary. Left and right pleated sections 76 and 78 are thus equal in width W3, as are each of panels 1-24 as measured axially between the respective left and right folds which form the respective left and right edges of a given panel.

As shown in FIG. 4, blanket 30 in the fully collapsed position has a length L2 typically defined between axial folds AF1 and AF2, which serve as the front and back edges respectively of blanket 30 in the fully collapsed position. Although folds AF1 and AF2 typically form the front and back edges in the fully collapsed position, edge 68 of axial section 104 may, for example, extend beyond axial fold AF1 such that edge 68 may form the front edge in a fully collapsed position. In any case, length L2 in the exemplary embodiment is approximately ⅓ of length L1 inasmuch as there are two axial folds dividing blanket 30 into the three axial sections having approximately the same length L2 although this may vary somewhat. Length L2 thus represents the longitudinal length of blanket 30 in the fully collapsed position as well as of each of axial sections 100, 102, and 104. Length L2 in the exemplary embodiment is typically on the order of about 8 to 9 inches. It has been found that two axial folds are well suited to provide a size of blanket 30 in the fully collapsed position which is well suited for use in selling to retail customers. However, a single axial fold may be used so that the longitudinal length in the fully collapsed position is within a reasonable range for selling in a retail market. Although more than two axial folds may be used, it is generally preferred to keep the number of axial folds to a minimum to simplify the manufacturing process and to generally minimize the overall thickness of blanket 30 in the fully collapsed position. In addition, maintaining a relatively minimal number of axial folds helps eliminate the possibility of tearing a piece 60 of foil during the manufacturing process.

Figure 5:
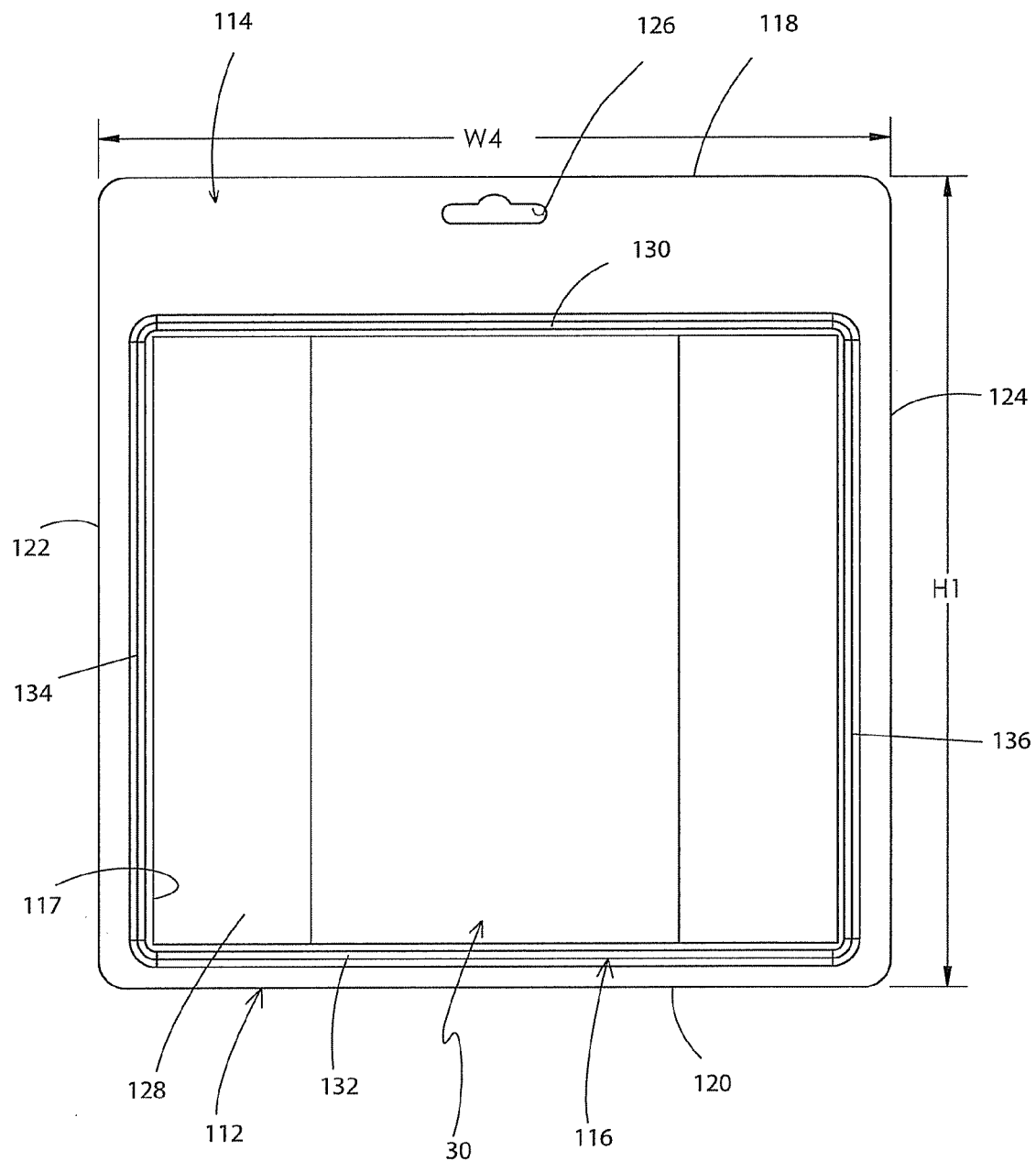
FIG. 5 is a front elevational view of a retail packet which contains the blanket in its fully collapsed position.

In the fully collapsed position, blanket 30 may be closed in a package such as a blister package 112, which is shown in FIG. 5 and is well suited for displaying blanket 30 for sale in a retail establishment. Package 112 typically includes a flat back layer or wall 114 formed of a sheet of plastic, heavy paper, cardboard or the like. Package 112 further includes a transparent blister or bubble 116 which is secured to wall 114 and extends forward therefrom such that wall 114 and bubble 116 define an interior chamber 117 in which blanket 30 is contained. Back wall 114 has horizontal top and bottom edges 118 and 120, and left and right vertical edges 122 and 124. A hanging hole 126 is formed through an upper portion of back wall 114 generally adjacent top edge 118 so that package 112 may be displayed by hanging on a rod received through hole 126. Bubble 116 includes a flat front wall 128 which is typically substantially square or rectangular when viewed from the front, horizontal top and bottom walls 130 and 132, and vertical left and right side walls 134 and 136. Walls 130, 132, 134, and 136 are connected to the outer perimeter of front wall 128 and extend rearwardly therefrom to connect to back wall 114. Left and right edges 122 and 124 define therebetween a width W4 which in the exemplary embodiment is on the order of about 10 to 11 inches. Top and bottom edges 118 and 120 define therebetween a height H1 which is also typically within the range of about 10 to 11 inches. Thus, blanket 30 in the fully collapsed position is well suited to be packaged as in package 112 for retail sales.

The method of making blanket 30 in accordance with the present invention is now discussed with primary reference to FIGS. 6-15. FIG. 6 shows piece 60 of foil in a flat horizontal position prior to any of the forming processes involved in turning sheet 60 into blanket 30. At this stage, piece 60 is a flat rectangular sheet having a flat rectangular top surface 140 and flat rectangular bottom surface 142. Top and bottom surfaces 140 and 142 define the thickness of piece 60, which was discussed earlier. Left edge 80 intersects with front edge 66 to form a front left corner 144 and with back edge 68 to form a back left corner 146. Right edge 82 intersects front edge 66 to form a front right corner 148 and intersects back edge 68 to form a back right corner 150. FIG. 6 shows that edges 66 and 68 define therebetween length L1, which is about the same as the length of blanket 30 in the position shown in FIG. 1. FIG. 6 also shows that edges 80 and 82 define therebetween an axial width W5 of piece 60 which is in the exemplary embodiment about 36 inches and which typically ranges from about 25 inches to about 40 inches. FIG. 6 also shows 23 longitudinal folded lines FL1-FL23 which are parallel to one another and evenly spaced from one another in the axial direction. These fold lines are shown in dashed lines and are simply imaginary locations along which piece 60 will be folded back and forth in the folding process to form panels 1-24. FIG. 6 shows a central portion 74A which will become panels 11-14 and ultimately central section 74 illustrated in FIG. 1. FIG. 6 also shows a left portion 76A which will become panels 1-10 and ultimately left pleated section 76. FIG. 6 also shows a right portion 78A of piece 60 which will become panels 15-24 and ultimately right pleated section 78.

Backing up a step in the forming process, piece 60 starts out on a roll of foil wherein the length of the roll is length L1. The roll is fed into a pleating machine which alternately folds the foil back and forth along fold lines 1-23 in an accordion style fashion so that panels 1-24 are formed with equal widths W3. The pleating machine also cuts the roll of foil to form one of edges 80 and 82 and produce piece 60 in the fully folded or pleated configuration shown in FIGS. 7 and 8. As viewed from above (FIG. 7), only top surface 140 of panel 24 is visible inasmuch as all of the remaining panels 1-23 are directly below panel 24. Thus, in this fully pleated position of piece 60 of foil, piece 60 appears as a rectangle having length L1 and width W3. In this fully pleated position, piece 60 has a thickness or height H2 (FIG. 8) which is the combination of all of panels 1-24 stacked atop one another via the folding process. Height H2 is thus at least the number of panels formed in this folding process times the single thickness of piece 60 in its unfolded state. In the exemplary embodiment, height H2 is thus at least 24 times the single thickness of piece 60 and may be somewhat larger than that depending on how much space is between each panel. Generally, each of the adjacent panels in this fully pleated position is abutting or closely adjacent the adjacent panel or panels, and all of the panels are parallel and horizontal.

Figure 8:
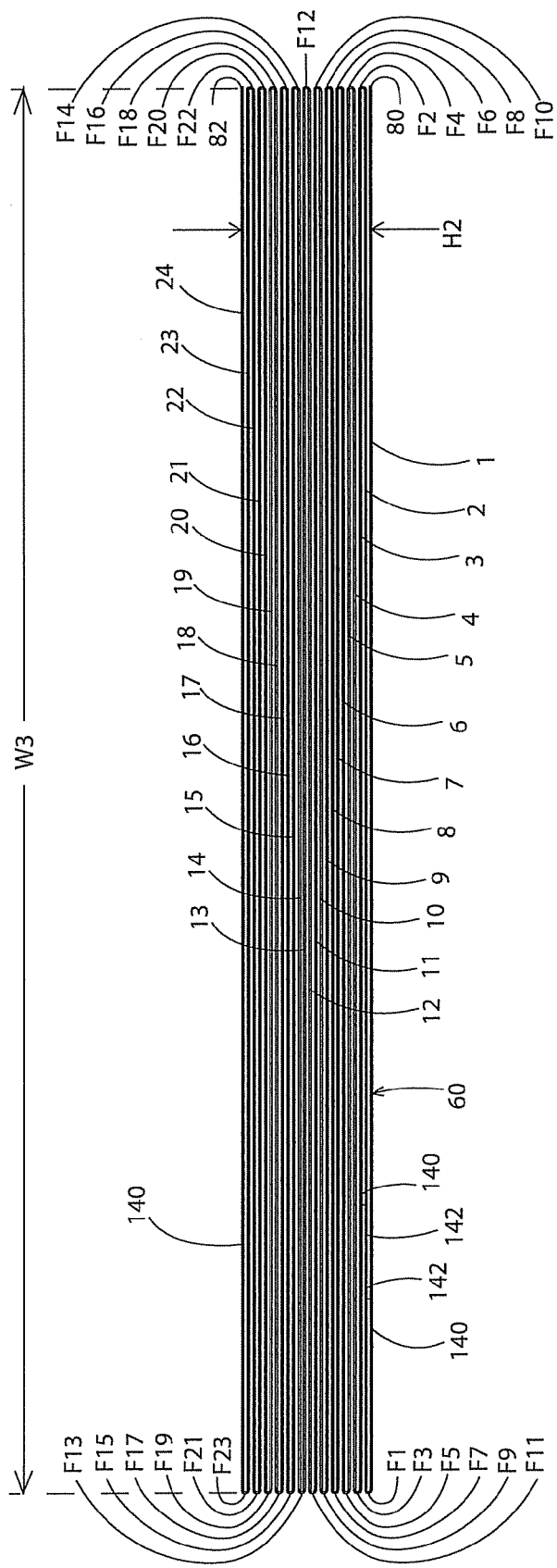
FIG. 8 is an end elevational view of the fully pleated piece of foil taken on line 8-8 of FIG. 7.

More particularly, the pleating or folding of sheet 60 back and forth involves the folding of sheet 60 along fold line FL1 (FIG. 6) to form fold F1 (FIG. 8). In addition, piece 60 is folded in the opposite direction along fold line F2 to form fold F2, then back in the opposite direction along fold line F3 to form fold 3 and so forth such that fold lines FL1-FL23 correspond respectively to folds 1-23, which are illustrated in FIG. 8. As FIG. 8 shows, the odd numbered folds are all aligned with one another while the even numbered folds are likewise all aligned with one another.

Figure 9:
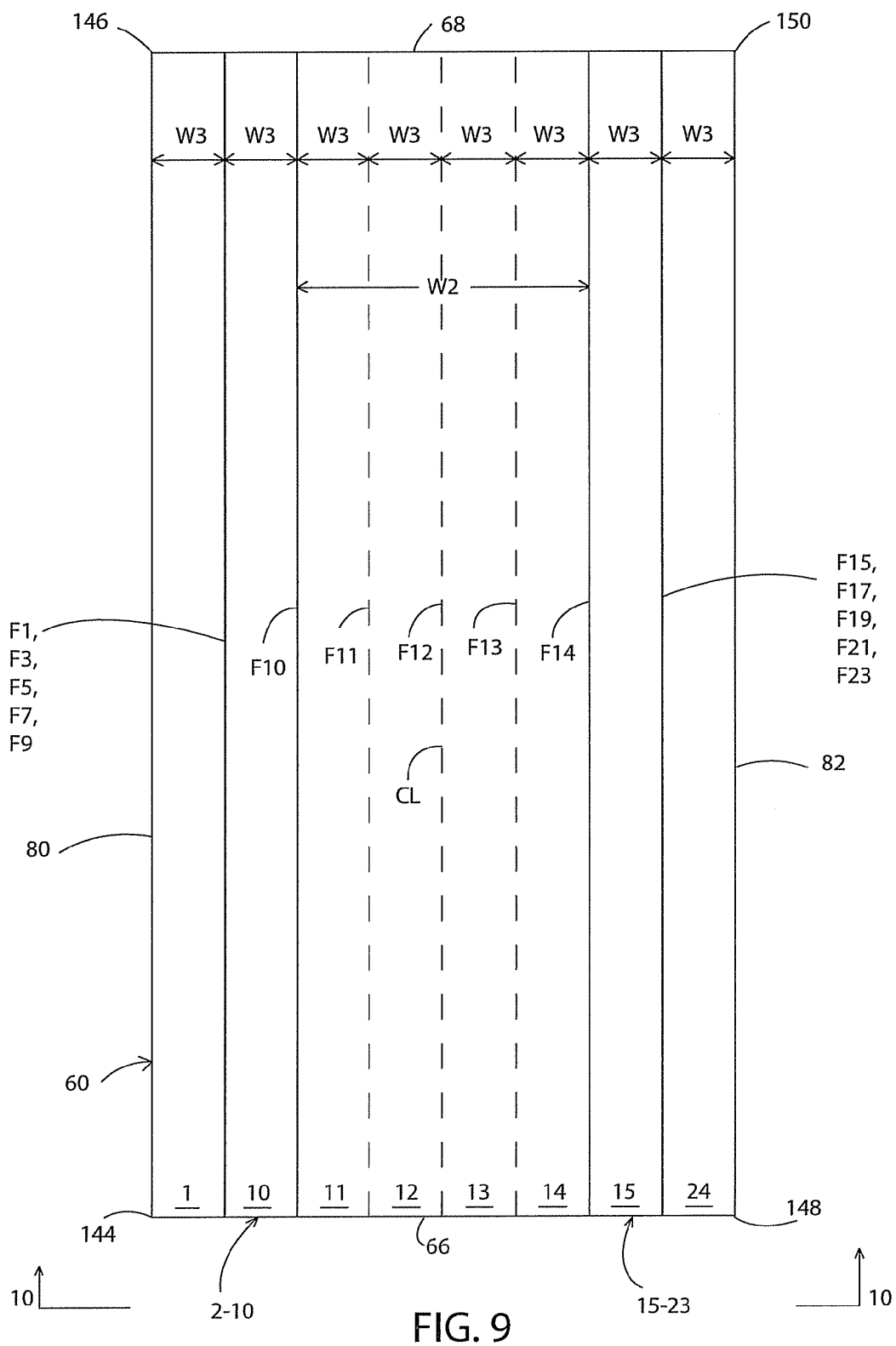
FIG. 9 is a top plan view of a piece of foil with selected panels of the fully pleated foil having been unfolded.
Figure 10:
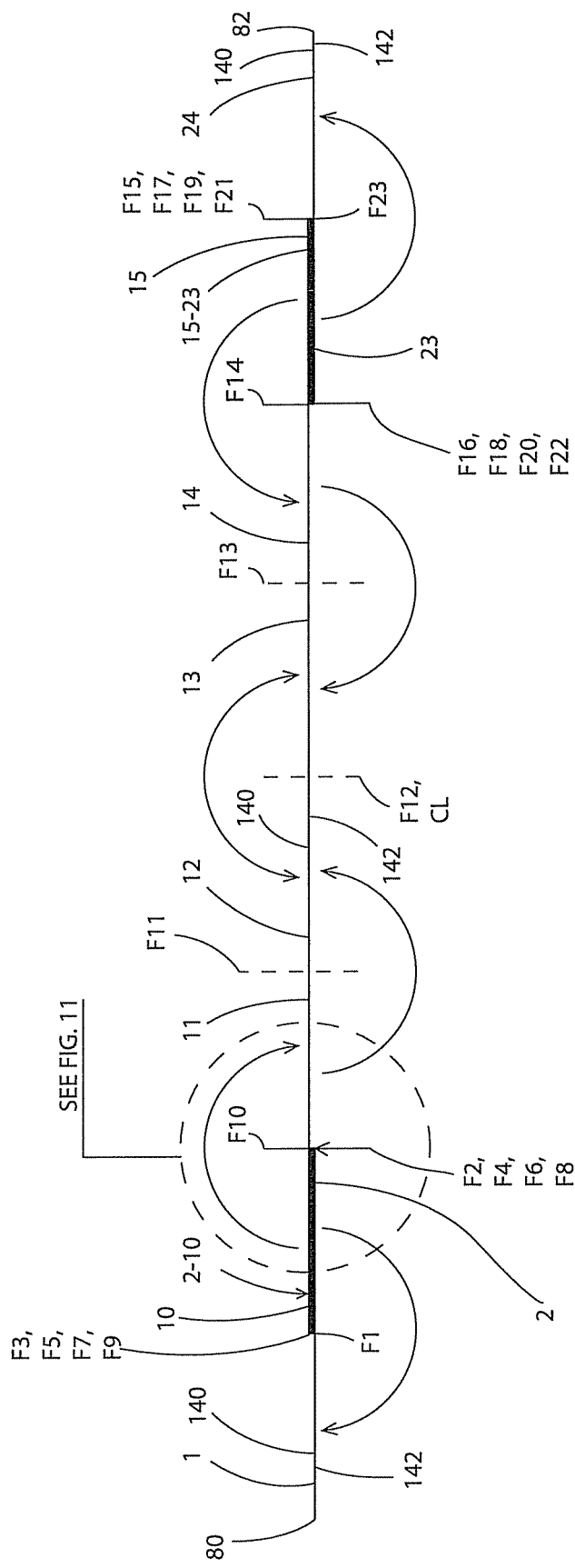
FIG. 10 is an end elevational view taken on line 10-10 of FIG. 9 illustrating the partial unfolding process.
Figure 11:
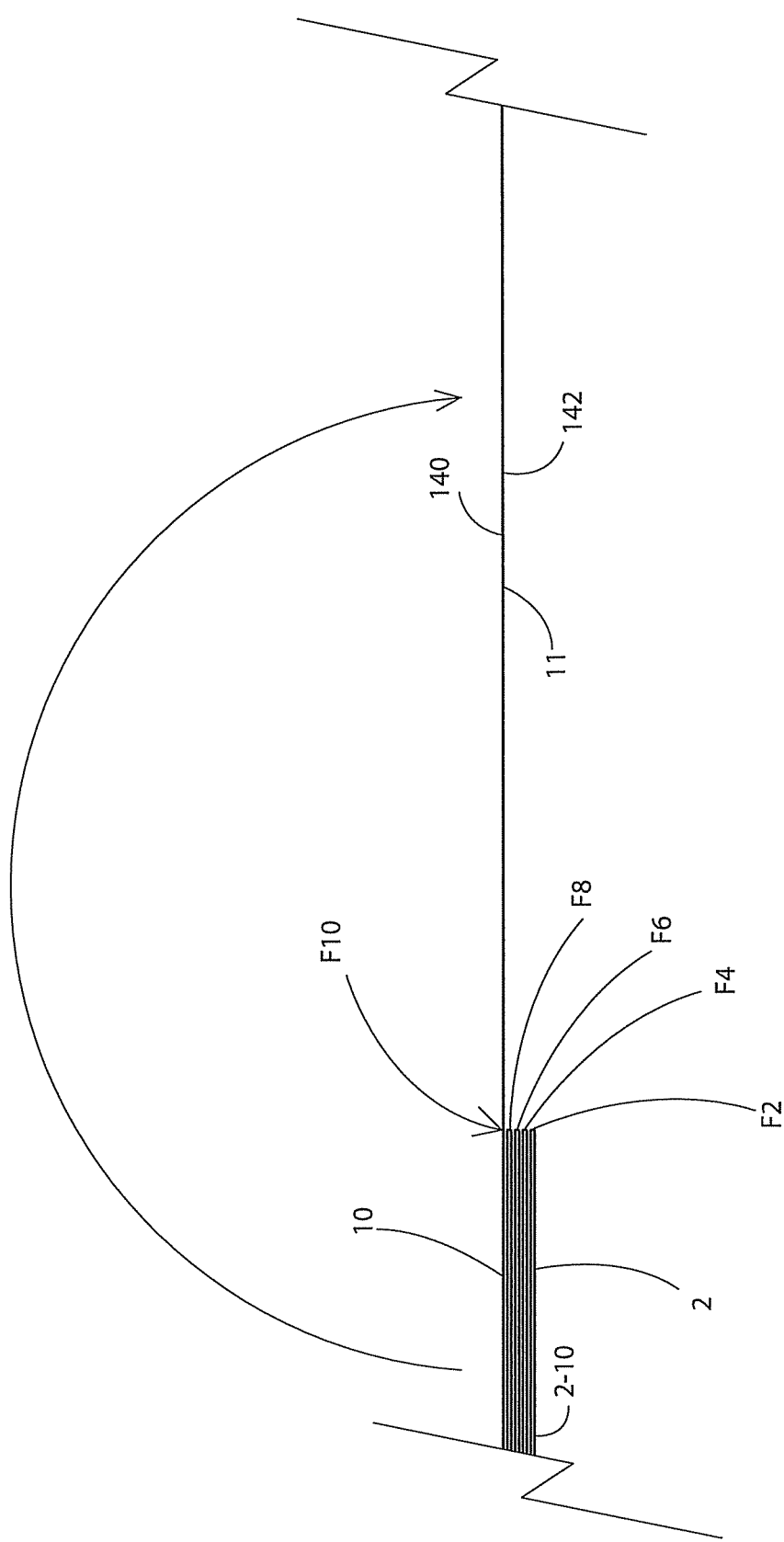
FIG. 11 is an enlarged view of the encircled portion of FIG. 10.

From the fully pleated configuration of FIG. 8, selected panels are unfolded relative to one another along respective folds to create the configuration shown in FIGS. 9 and 10. More particularly, piece 60 is unfolded along folds F1, F10-F14, and F23. The unfolding process is illustrated by the various semicircular arrows in FIG. 10. The unfolding of panels 10-15 along folds 10-14 forms a central section of a single thickness made up of panels 11-14 which ultimately become central section 74 (FIG. 1). At this stage, panels 10-15 form a single flat layer, panels 2-9 are disposed directly beneath panel 10, panel 1 extends out to the left by itself from its connection with panel 2 at the unfolded fold 1, panels 16-23 are directly below panel 15, and panel 24 extends outwardly to the right by itself from its connection with panel 23 at unfolded fold 23. During this process, the central fold F12 at center line CL is unfolded along with the two folds F13 and F14 to its right and the two folds F10 and F11 to its left. FIG. 11 is an enlarged figure of the encircled portion of FIG. 10 showing the unfolding process between panels 10 and 11 along fold 10.

Figure 12:
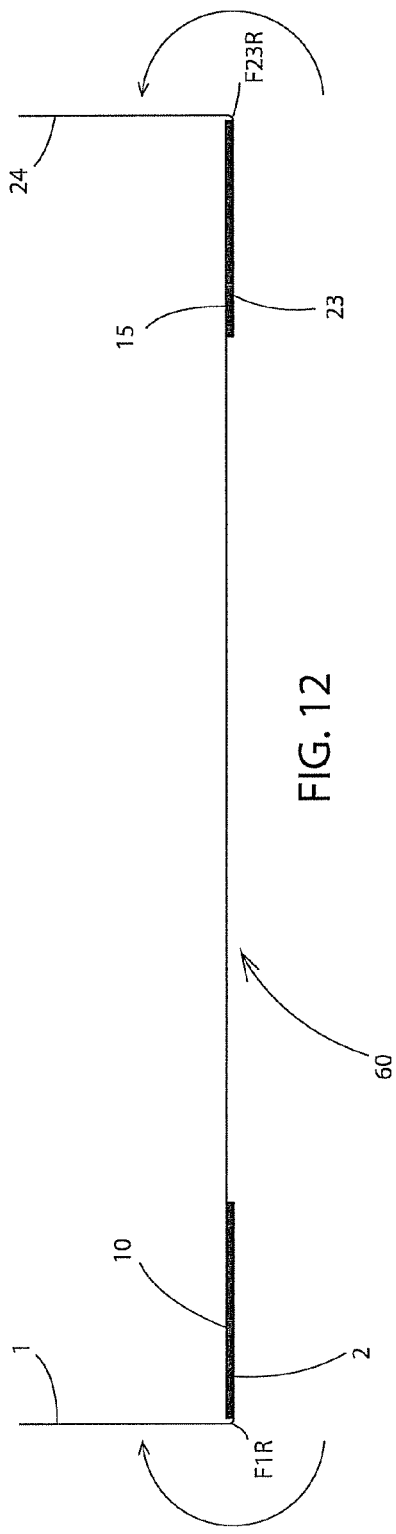
FIG. 12 is similar to FIG. 10 and shows an intermediate step of the reverse folding of the left and right end panels.
Figure 13:
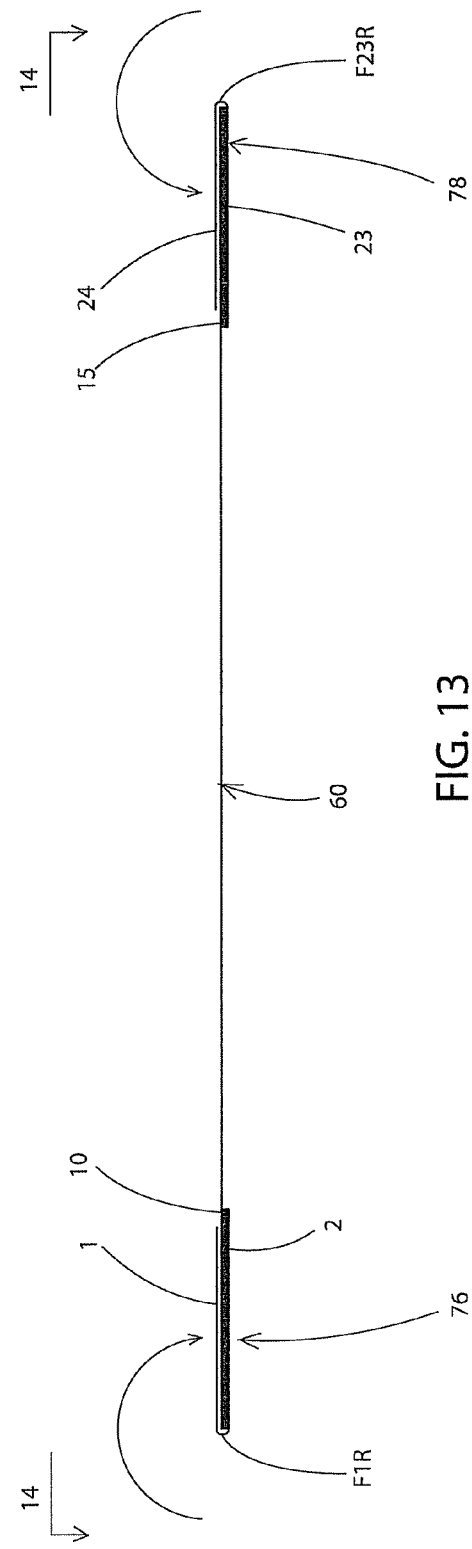
FIG. 13 is similar to FIG. 12 and shows the completed reversed folding of the left and right end panels to overlay the remaining panels of the respective left and right pleated sections.
Figure 14:
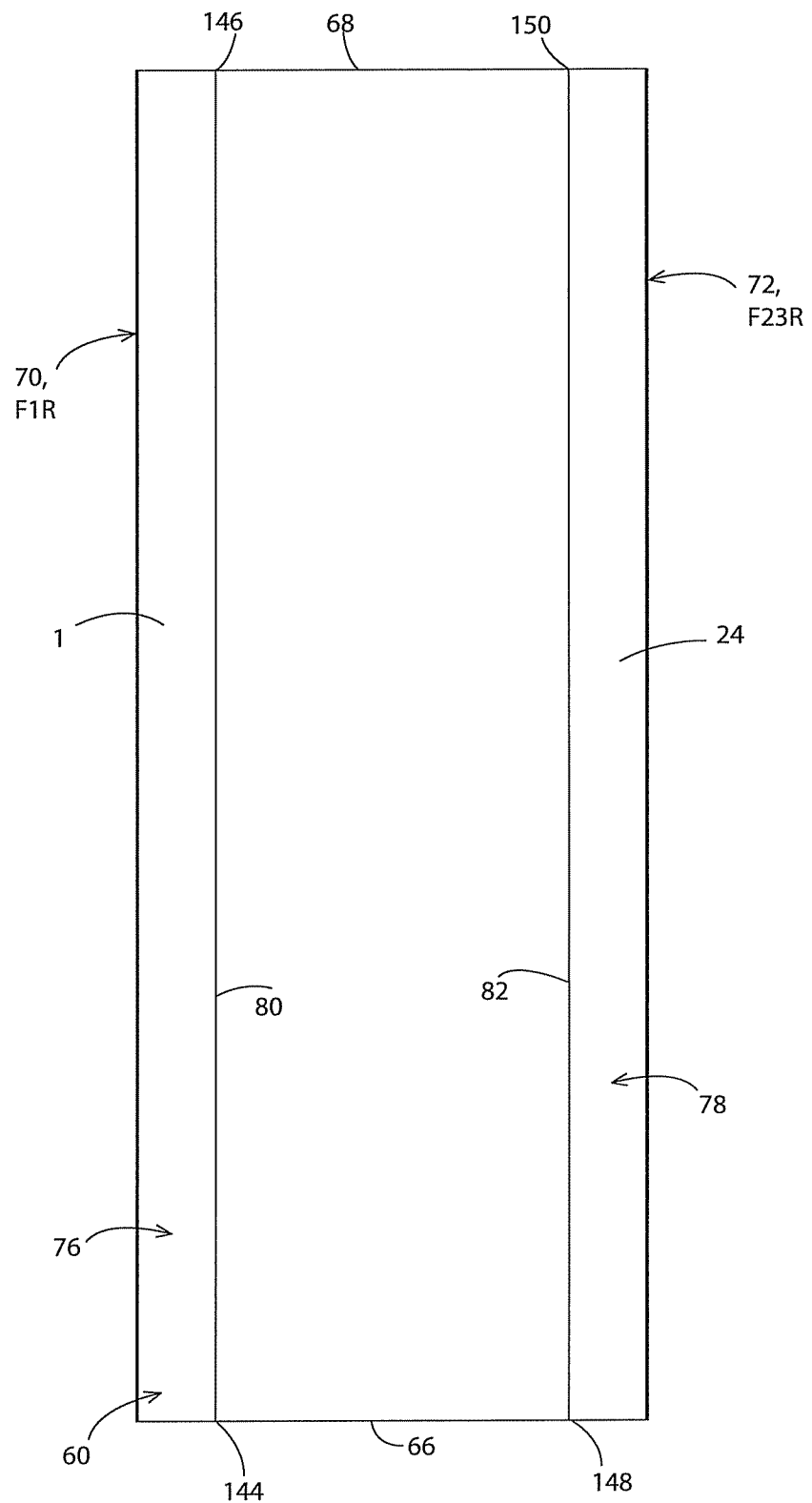
FIG. 14 is a top plan view taken on line 14-14 of FIG. 13.
Figure 15:
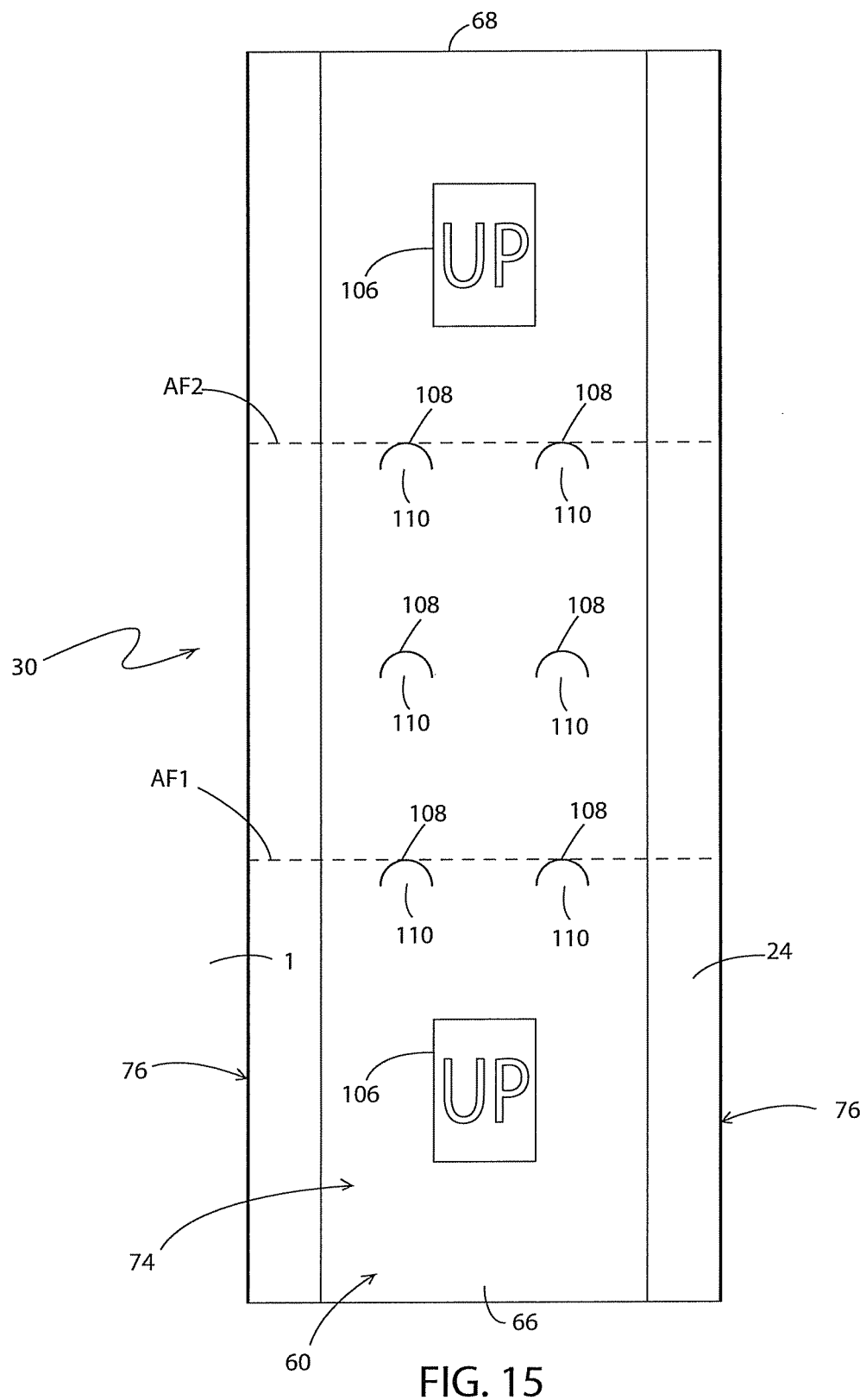
FIG. 15 is similar to FIG. 14 showing the blanket after the drain holes have been cut therein and the orientation indicators embossed thereon to produce the configuration also shown in FIG. 1.

From the position shown in FIGS. 9 and 10, panels 1 and 24 are folded in a reverse manner opposite to the original fold along folds F1 and F23 as illustrated in FIGS. 12 and 13 to form reverse folds F1R and F23R respectively. More particularly, FIG. 12 illustrates panels 1 and 24 having been folded in the reverse direction to a position at about 90° to the remaining panels, and FIG. 13 shows the continued reverse folding of panels 1 and 24 into their final position such that panel 1 is directly over panels 2-10 and panel 24 is directly over panels 15-23. FIG. 14 illustrates the same position of FIG. 13 after the reverse folds of panels 1 and 24 as viewed from the top. The reverse folding of panels 1 and 24 thus finalizes the formation of left and right pleated sections 76 and 78, as labeled in FIGS. 13 and 14, although this may further include pressing panels 1-10 together and panels 15-24 together to make them as flat as possible, as well as creation of axial folds AF1 and AF2. A review of FIGS. 9, 10, and 14 also illustrates that each of panels 1 and 24 swings or pivots axially outwardly about the respective folds F1 and F23 from a position respectively under panels 2-10 and 15-23 to an intermediate position of FIG. 10 in which edges 80 and 82 and the corners thereof are respectively spaced outwardly of panels 2-10 and panels 15-23, and then further upwardly and axially inwardly to their final position respectively above panels 2-10 and panels 15-23 so that edges 80 and 82 and the respective corners are respectively directly above panels 2-10 and panels 15-23.

The next step is to form embossed sections 106, axial folds AF1 and AF2, and U-shaped slits 108, which define flaps 110. Although this may be done in separate steps, it is preferably done in a single step simultaneously by placing the blanket under a die-cutting machine that presses down and in a single hit, squeezes the accordion style folds of the pleated sections tight, cuts slits or drain holes 108, and embosses sections 106 whereby central section 74 is completed and all of the steps require to create blanket 30 in the position of FIG. 1 are also completed. To be accurate, the axial folds AF1 and AF2 at this stage are folding creases such that the overall configuration of blanket 30 still remains substantially flat and horizontal. After this step, the blanket is removed from the cutting machine and typically manually folded along the folding creases AF1 and AF2 in order to move the blanket from the position of FIGS. 1 and 15 to the fully collapsed position of the blanket illustrated in dashed lines in FIG. 4 and in which the blanket is inserted into package 112 of FIG. 5.

Figure 16:
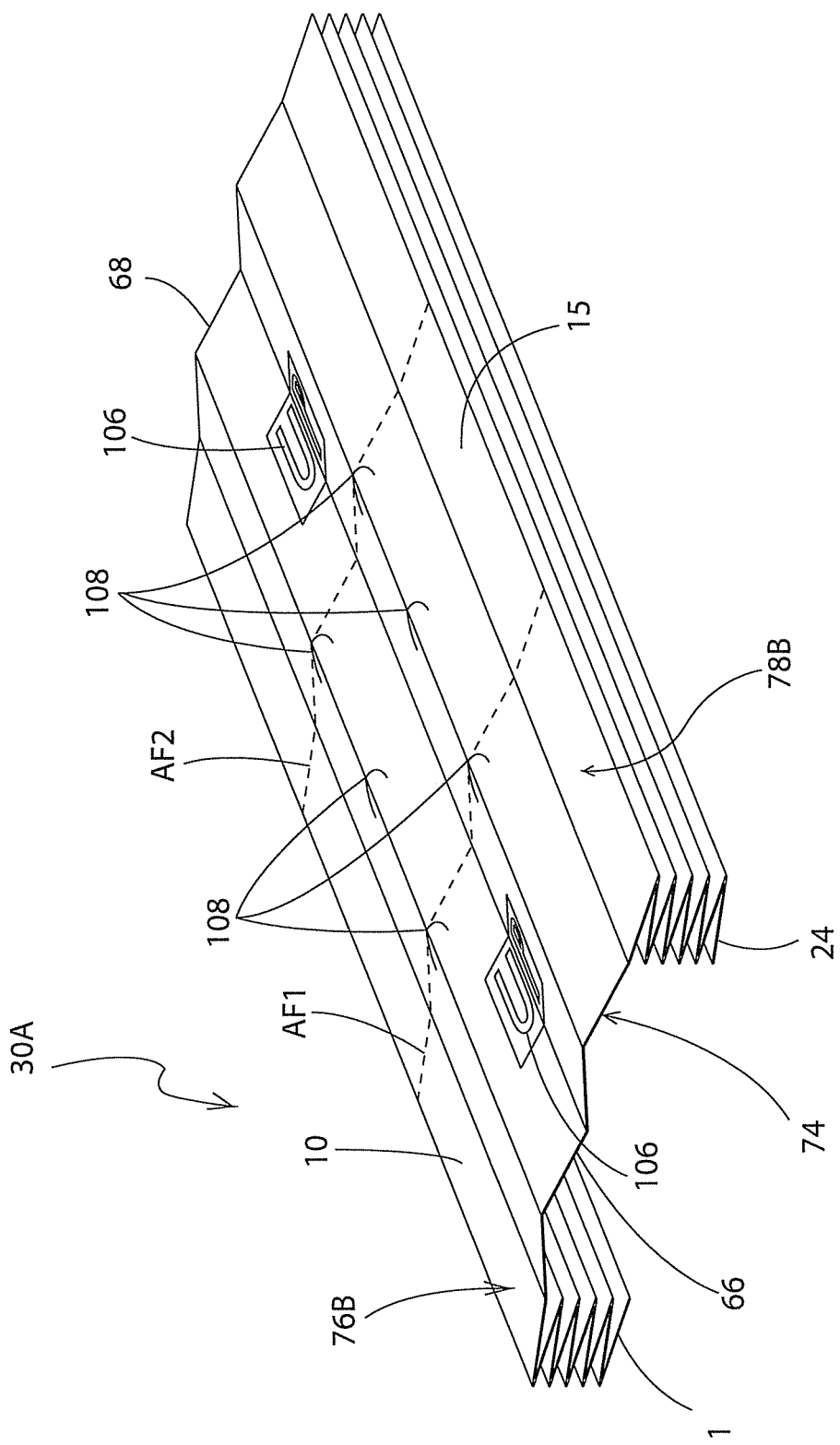
FIG. 16 is a perspective view of the blanket showing the left and right pleated sections partially expanded and without the reverse folding of the left and right panels.
Figure 17:
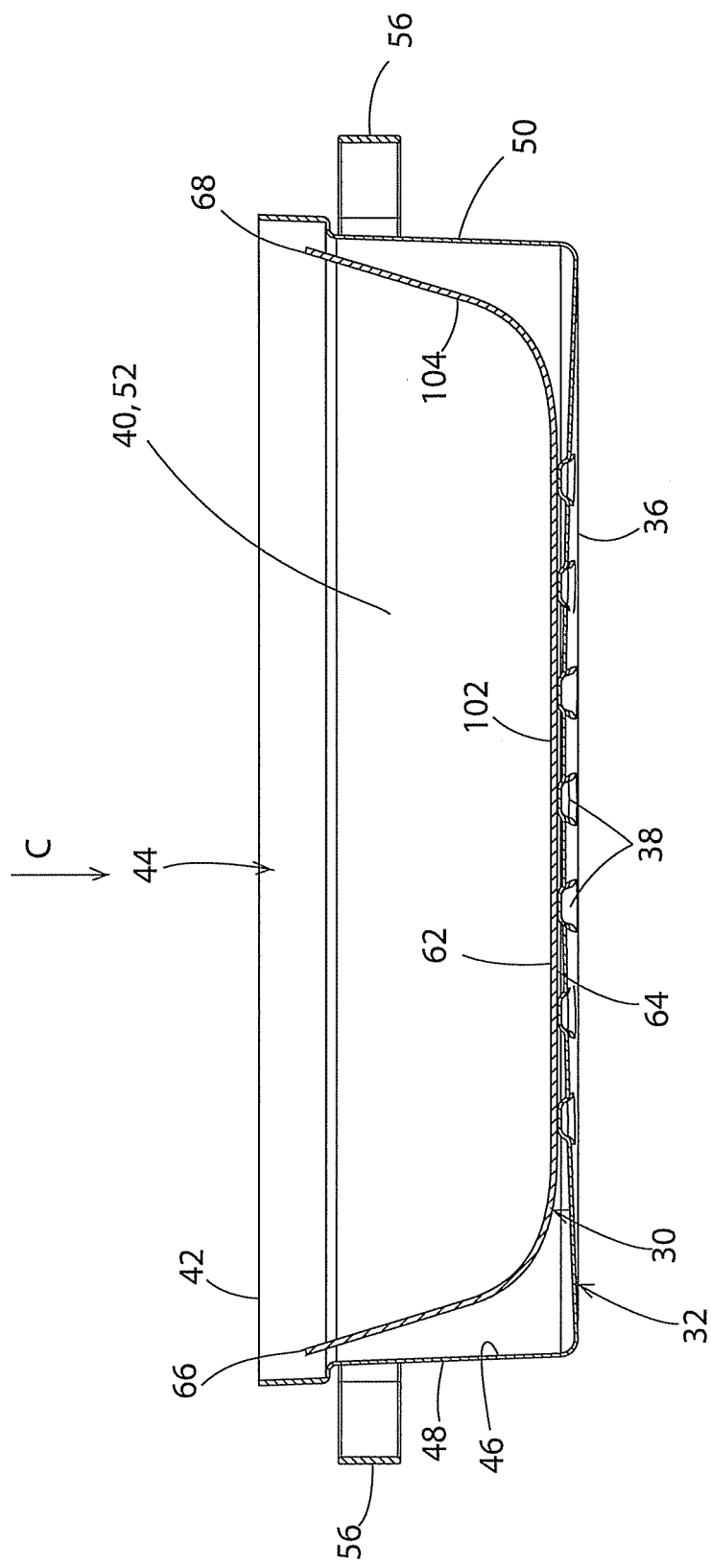
FIG. 17 is a sectional view taken from the side of the roasting pan and blanket disposed therein.

FIG. 16 illustrates that the turkey blanket may also be formed without folding panels 1 and 24 in the reverse fashion discussed earlier such that panels 1 and 24 wrap around the other panels of the corresponding pleated sections. Thus, FIG. 16 illustrates a slightly modified blanket 30A having left and right pleated sections 76B and 78B in which the panels 1 and 24 remain as the bottom panels of the respective pleated sections. Thus, panel 1 is directly under panels 2-10 while panel 24 is directly under panels 15-23. Otherwise, blanket 30A is the same as blanket 30 and includes slits 108 and logo sections 106 and the folds or folding creases AF1 and AF2 so that blanket 30A may also be folded into the fully collapsed position.

Figure 18:
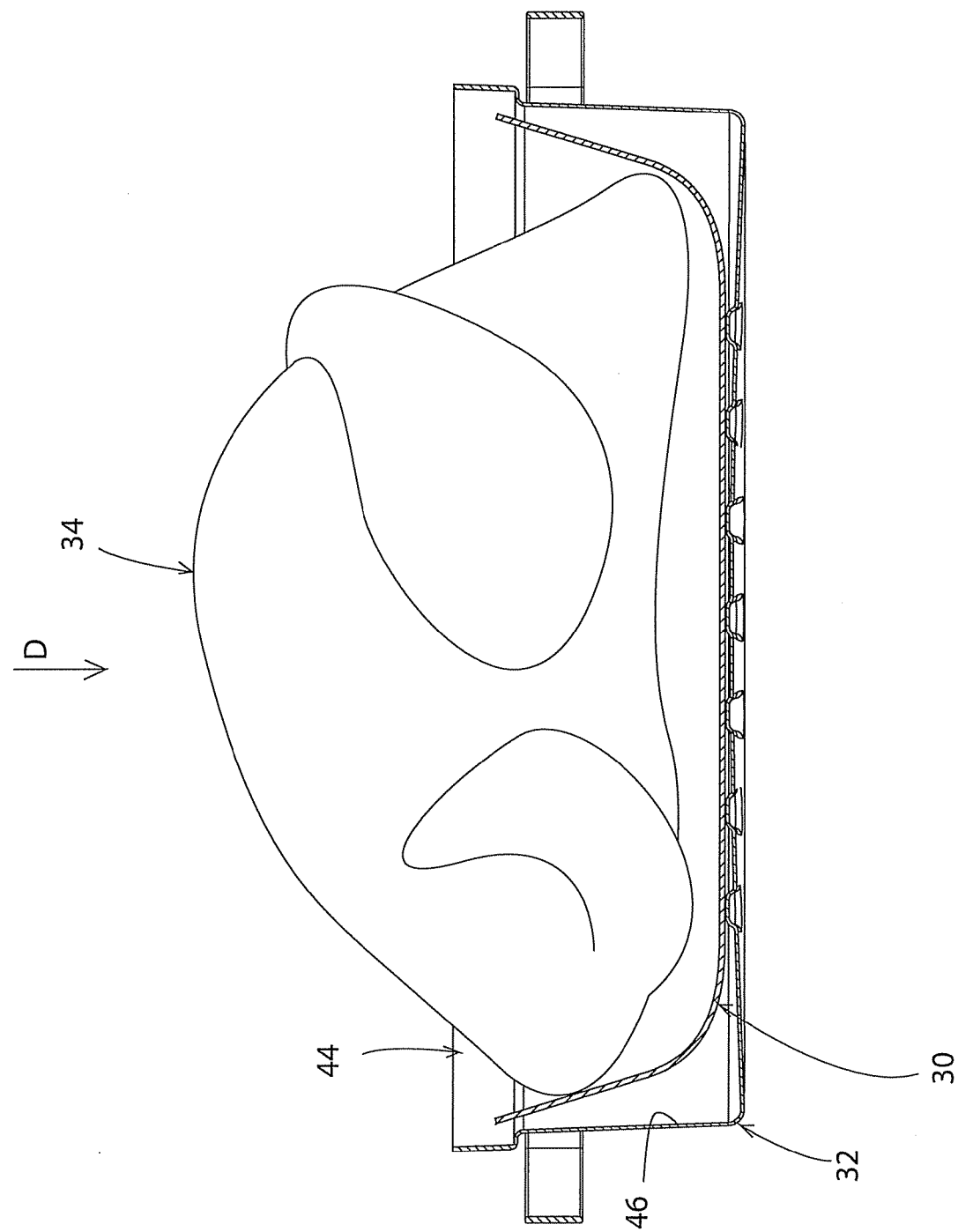
FIG. 18 is similar to FIG. 17 and shows the turkey having been lowered onto the blanket within the pan.
Figure 19:
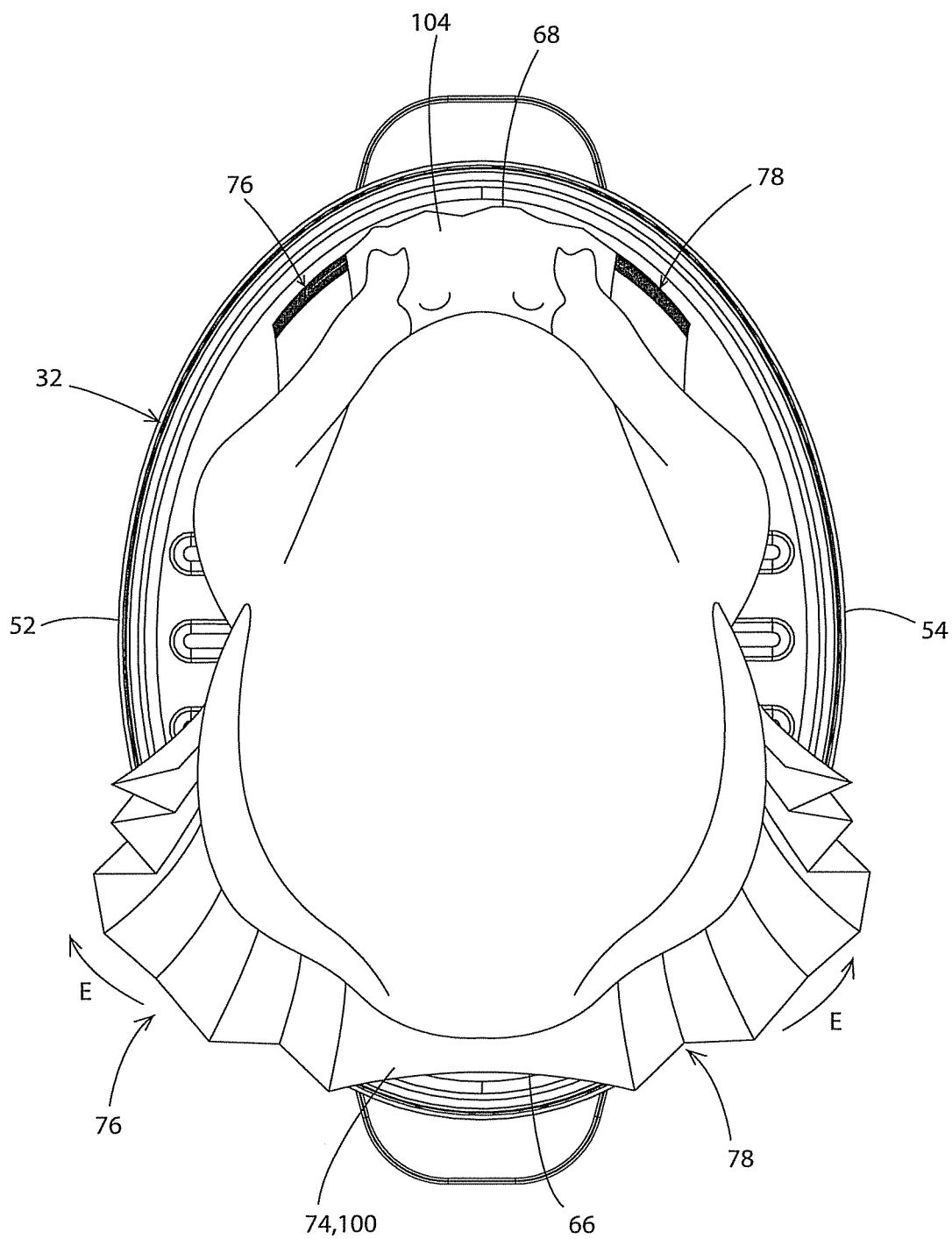
FIG. 19 is a top plan view of the turkey and blanket within the pan showing the blanket partially unfolded along one end to the left and right.
Figure 20:
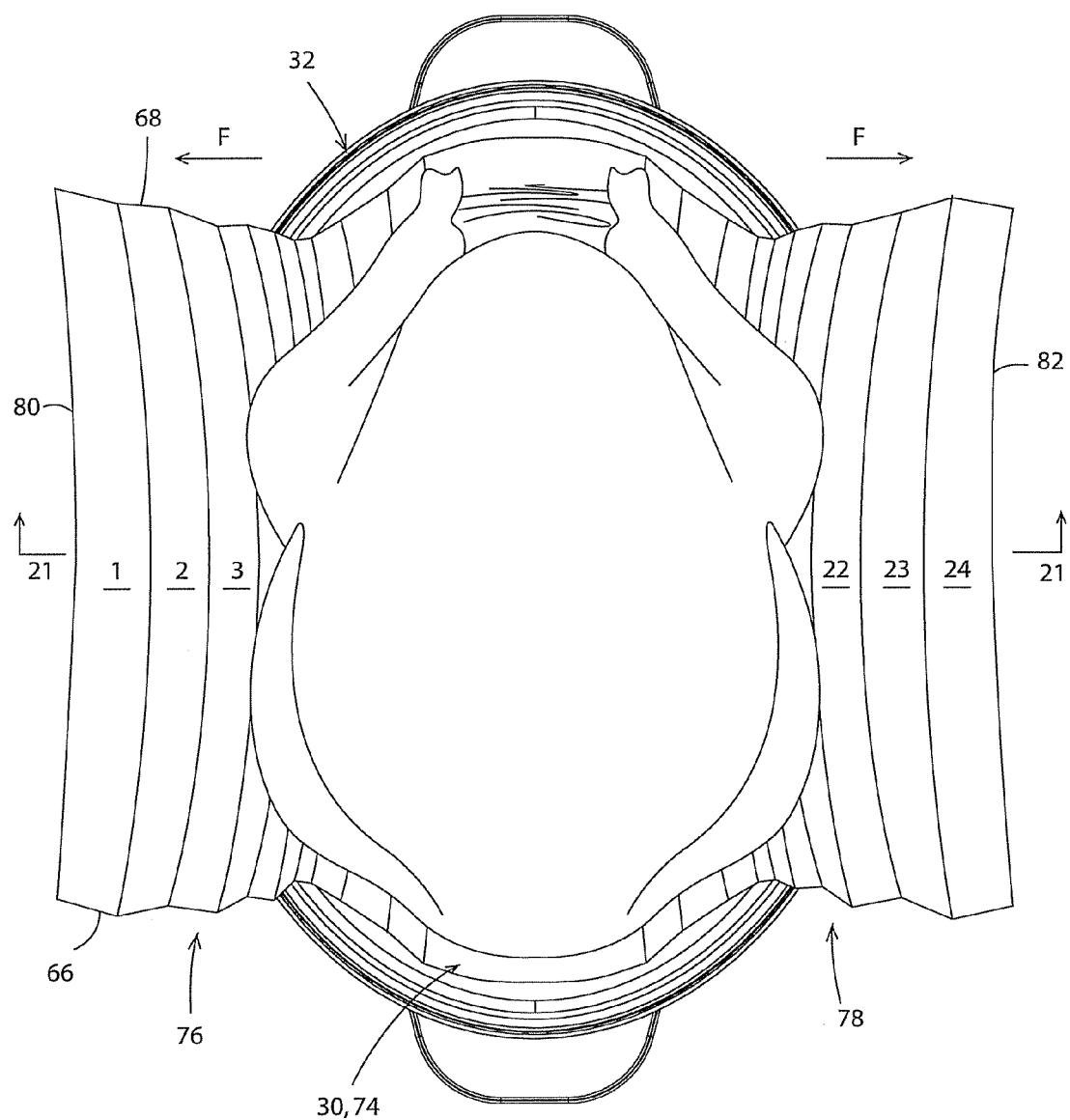
FIG. 20 is similar to FIG. 19 and shows a further stage of unfolding of the left and right pleated sections.
Figure 21:
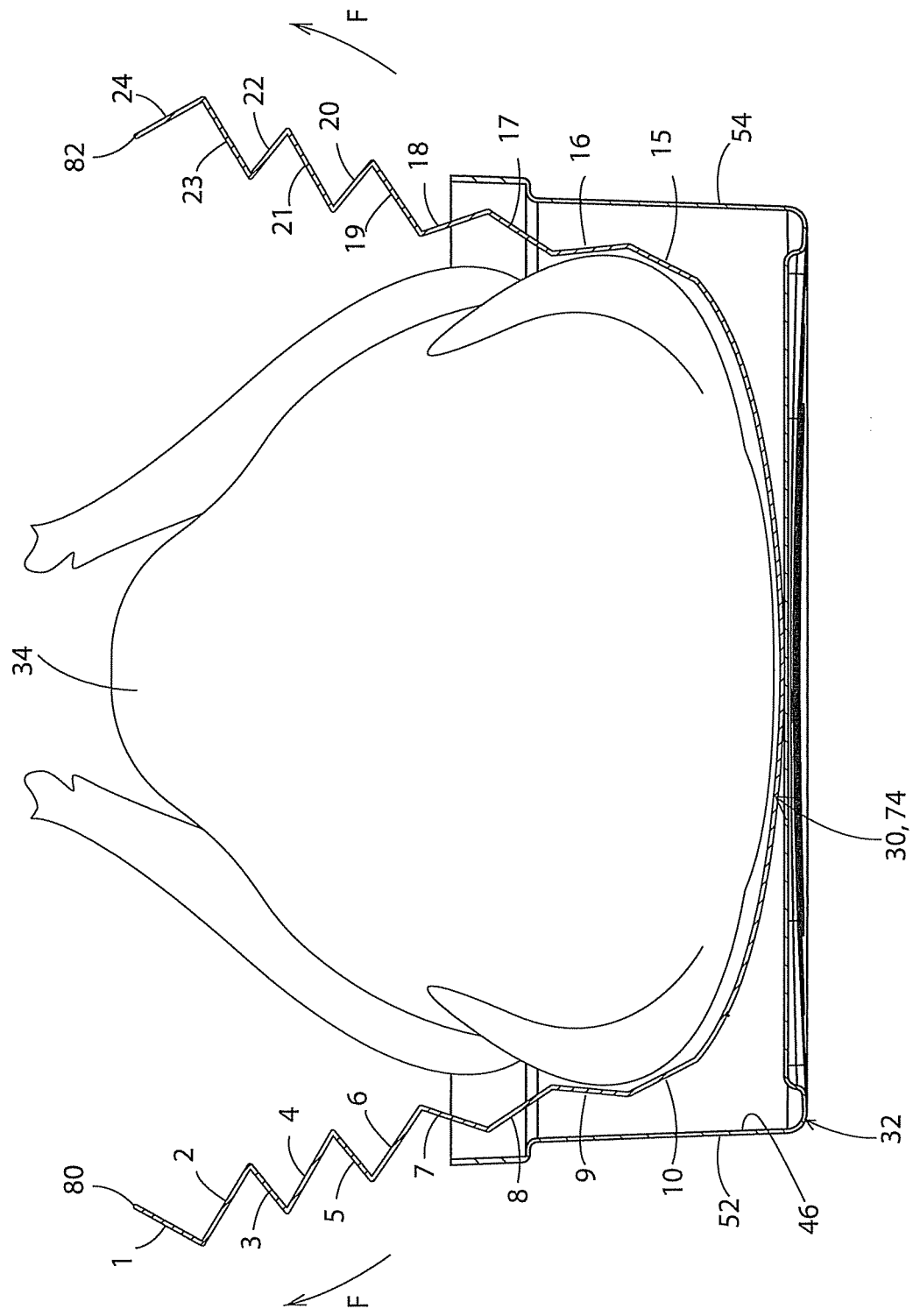
FIG. 21 is an end sectional view taken on line 21-21 of FIG. 20.

The use of blanket 30 for the purpose of cooking and lifting turkey 34 or another fowl is now described with primary reference to FIGS. 17-23. After blanket 30 is removed from package 112 (FIG. 5) and unfolded from its fully collapsed position (Arrows B in FIG. 4), blanket 30 is inserted downwardly from the position of FIG. 1 to the position of FIG. 17 (Arrow C) through entrance opening 44 into interior chamber 46 of roasting pan 32 so that the bottom 64 of blanket 30 is seated on the bottom wall 36 and/or ribs 38 thereof. In this position, the central portion such as portion 102 of blanket 30 is typically substantially horizontal and in contact with the bottom of the pan while other portions may extend upwardly, such as sections 100 and 104 so that ends 66 and 68 are facing generally upwardly and may be adjacent top edge 42 of the side wall of the pan. As shown in FIG. 18, turkey 34 may then be lowered manually (Arrow D) into the interior chamber 46 of pan 32 via entrance opening 44 to rest atop the top 62 of blanket 30, typically on central section 74 directly over center line CL with edges 66 and 68 extending respectively forward and rearward of turkey 34. Once the turkey is inserted into the pan, the user begins to unfold the pleated sections 76 and 78 in order to spread them out to the left and right respectively as indicated at Arrows E in FIG. 19. FIG. 19 illustrates more particularly that left pleated section 76 is unfolded to expand it to the left and upwardly along front edge 66 between the left side of turkey 34 and left wall 52 of pan 32 while the right pleated section 78 along edge 66 is unfolded to expand upwardly and to the right in between the right side of turkey 34 and right wall 54 of pan 32. FIG. 19 shows left and right pleated sections 76 and 78 along back edge 68 still substantially unfolded. FIG. 20 illustrates the further unfolding and expansion of the left and right pleated sections (Arrow F) such that left pleated section 76 along its entire length between ends 66 and 68 is expanded to the left and upwardly between the left of the turkey and the left wall of pan 32 and above the left wall, as also illustrated in FIG. 21. FIGS. 20 and 21 further illustrate that right pleated section 78 is likewise fully expanded along its entire length between the right of the turkey and the right wall of pan 32 and above the top of right wall 54. Left and right sections 76 and 78 thus define therebetween a turkey-receiving, fowl-receiving or food-receiving space in which turkey 34 is disposed.

Figure 22:
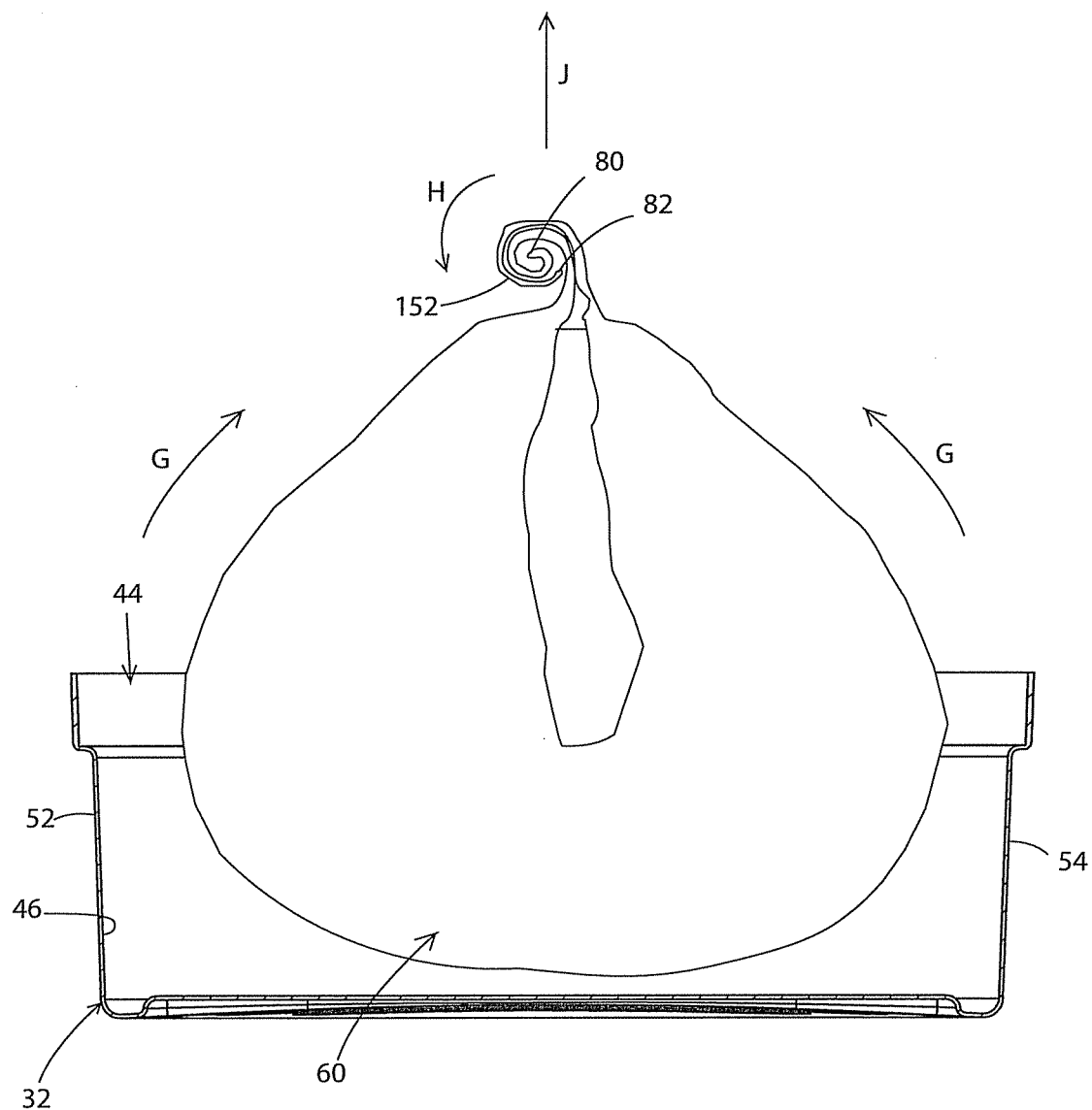
FIG. 22 is similar to FIG. 21 and shows only the pan in a sectional view with the edges of the foil rolled into lifting handles.

The unfolding of the pleated sections continues from the position shown in FIG. 21 such that edges 80 and 82 move respectively to the right and left toward one another and upwardly over the turkey (Arrows G in FIG. 22) until edges 80 and 82 are adjacent one another. The user can manually roll the portions of piece 60 along edges 80 and 82 together (Arrow H) to form a rolled handle or handles 152 above the fowl-receiving space and turkey 34, and so that piece 60 of foil substantially or completely encloses or surrounds turkey 34 although the user may leave openings along edges 80 and 82 or along the front edge 66 or the back edge 68 if desired. The turkey, wrapped in piece 60 of foil and disposed within pan 32, and is then inserted into a standard oven to be cooked, after which the pan, turkey and foil are removed from the oven so that the turkey may be removed from the pan. More particularly, FIG. 22 illustrates at Arrow J that the user may manually grasp handle or handles 152 and then manually lift (Arrow J) the turkey and foil via the handle or handles 152 out of pan 32 via entrance opening 44. The user will typically hold the turkey and foil via handles 152 over pan 32 to allow the various cooking juices or liquids to drain out through drain holes 110 and/or along openings formed at edges 66 or 68 in order to minimize the dripping of such juices when moving the turkey and foil away from pan 32. The user then moves the turkey via handles 152 away from a position over pan 32 and lowers (Arrow K in FIG. 23) the turkey and foil on to a support surface 154 such as a counter, table, cutting board or so forth. The user may allow the turkey to sit wrapped in the foil for as long as desired, and remove the foil when desired. Piece 60 of foil may then be discarded by the user.

The present invention thus provides a cooking blanket and lifter suitable for use in cooking a turkey or other relatively large fowl in an oven such that the blanket may be expanded to wrap the turkey during cooking and afterwards, and also rolled to form handles with which to lift the turkey from the roasting pan. The present invention also provides a method of forming the blanket of the present invention which is simple and effective. As previously discussed with regard to the method of manufacturing blanket 30, a piece 60 of foil is folded back and forth to form panels which lie back-to-back all the way across the piece of foil, after which certain panels are unfolded in order to form the central section 74 and to reverse flip the edge panels around the top of the other folds of the pleated sections. These unfolding steps could be performed by automation, or a machine may be built to form the pleated sections without folding the foil along the portion which becomes the central section. However, the present method is simple and provides an efficient and cost effective manufacturing process.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A cooking aid comprising:
   a piece of foil having front and back edges defining therebetween a longitudinal direction and left and right edges defining therebetween an axial direction; wherein the piece of foil is adapted for use in cooking a fowl in an oven; and
   a left pleated section of the foil which extends from the front edge to the back edge, which comprises a plurality of left panels folded along longitudinal folds and which is expandable from a folded position in which the left edge is at a first location to an unfolded position in which the left edge is at a second location in which the left edge in its entirety is to the left of the first location; and
   wherein the left panels include a bottom left panel and remainder left panels; and in the folded position, the bottom left panel is flat and horizontal, and the remainder left panels are flat, horizontal and directly above the bottom left panel; and
   wherein the left panels are folded back and forth at respective parallel left longitudinal folds and parallel right longitudinal folds: in the folded position, the left longitudinal folds are directly above one another; and in the folded position, the right longitudinal folds are directly above one another.

2. The cooking aid of claim 1 wherein the left panels include the bottom left panel folded at a reverse longitudinal fold around the left longitudinal folds;
   the lower left panel has a left edge.

3. The cooking aid of claim 1 further comprising an additional section of the foil which is to the right of the left pleated section and is formed of a single thickness of the piece of foil; and a drain hole formed in the additional section.

4. The cooking aid of claim 1 further comprising an additional section of the foil which is to the right of the left pleated section and is formed of a single thickness of the piece of foil; wherein in the folded position, the additional section is flat and horizontal.

5. The cooking aid of claim 1 further comprising first and second axial sections of the piece of foil which are folded about a first axial fold so that one of the first and second axial sections overlays the other of the first and second axial sections and so that the first and second axial sections are flat and horizontal.

6. The cooking aid of claim 5 further comprising a third axial section of the piece of foil which is folded about a second axial fold between the second and third axial sections so that one of the second and third axial sections overlays the other of the second and third axial sections and so that the third axial section is flat and horizontal.

7. The cooking aid of claim 1 further comprising a right pleated section of the foil which extends from the front edge to the back edge, which comprises a plurality of right panels folded along longitudinal folds and which is expandable from a folded position in which the right edge is at a third location to an unfolded position in which the right edge is at a fourth location to the right of the third location.

8. The cooking aid of claim 7 further comprising a central section of the foil between the left and right pleated sections.

9. The cooking aid of claim 8 further comprising a drain hole formed in the central section positioned beneath the fowl adapted to permit fluid to gravitationally flow away from the fowl.

10. The cooking aid of claim 9 wherein the drain hole is formed by a slit through the central section.

11. The cooking aid of claim 9 further comprising first and second axial sections of the piece of foil which are folded about a first axial fold extending from the left edge to the right edge so that one of the first and second axial sections overlays the other of the first and second axial sections and so that the first and second axial sections are flat and horizontal.

12. The cooking aid of claim 7 further comprising a fowl receiving space defined between the left and right pleated sections in the respective unfolded positions; and a rolled handle which is above the fowl-receiving space and formed of respective portions of the left and right pleated sections rolled together.

13. The cooking aid of claim 1 wherein the cooking aid consists essentially of the piece of foil.

14. The cooking aid of claim 7 wherein the right edge at the fourth location is in its entirety to the right of the third location.

15. The cooking aid of claim 12 wherein the handle extends from adjacent the front edge to adjacent the back edge.

16. The cooking aid of claim 13 wherein the cooking aid consists of the piece of foil.

17. A cooking aid comprising:
- a piece of foil having front and back edges defining therebetween a longitudinal direction and left and right edges defining therebetween an axial direction; wherein the piece of foil is adapted for use in cooking a fowl in an oven;
- a left pleated section of the foil which extends from the front edge to the back edge, which comprises a plurality of panels folded along longitudinal folds and which is expandable from a folded position in which the left edge is at a first location to an unfolded position in which the left edge is at a second location to the left of the first location, and wherein the left panels are folded back and forth at respective parallel left longitudinal folds and parallel right longitudinal folds; in the folded position, the left longitudinal folds are directly above one another; and in the folded position, the right longitudinal folds are directly above one another;
- wherein the piece of foil is movable between a fully collapsed position and a partially expanded and partially collapsed position;
- the piece of foil comprises first and second axial sections which in the fully collapsed position are folded about a first axial fold so that one of the first and second axial sections overlays the other of the first and second axial sections;
- the piece of foil comprises a third axial section which in the fully collapsed position is folded about a second axial fold between the second and third axial sections so that one of the second and third axial sections overlays the other of the second and third axial sections;
- in the fully collapsed position, the first, second and third axial sections are flat and horizontal;
- wherein the first axial section extends from the front edge to the first axial fold;
- the second axial section extends from the first axial fold to the second axial fold;
- the third axial section extends from the second axial fold to the back edge;
- in the partially expanded and partially collapsed position, the piece of foil is not folded at the first and second axial folds so that the first, second and third axial sections do not overlay one another;
- the front edge in the fully collapsed position is adjacent the first axial fold and distal the second axial fold;
- the back edge in the fully collapsed position is adjacent the second axial fold and distal the first axial fold.

18. The cooking aid of claim 17 wherein the front and back edges define therebetween a first longitudinal length of the piece of foil in the partially expanded and partially collapsed position;
- the front edge and the first axial fold define therebetween a longitudinal length of the first axial section which is approximately ⅓ the first longitudinal length;
- the first and second axial folds define therebetween a longitudinal length of the second axial section which is approximately ⅓ the first longitudinal length; and
- the second axial fold and the back edge define therebetween a longitudinal length of the third axial section which is approximately ⅓ the first longitudinal length.

19. A cooking aid consisting essentially of:
- a piece of foil;
- wherein the piece of foil has front and back edges defining therebetween a longitudinal direction and left and right edges defining therebetween an axial direction;
- the piece of foil is adapted for use in cooking a fowl in an oven; and
- the piece of foil comprises a left pleated section which extends from the front edge to the back edge, which comprises a plurality of left panels folded along longitudinal folds and which is expandable from a folded position in which the left edge is at a first location to an unfolded position in which the left edge is at a second location to the left of the first location; and
- wherein the left panels include a bottom left panel and remainder left panels; and in the folded position, the bottom left panel is flat and horizontal, and the remainder left panels are flat, horizontal and directly above the bottom left panel; and
- wherein the left panels are folded back and forth at respective parallel left longitudinal folds and parallel right longitudinal folds; in the folded position, the left longitudinal folds are directly above one another; and in the folded position, the right longitudinal folds are directly above one another.

20. The cooking aid of claim 19 wherein the cooking aid consists of the piece of foil.

21. The cooking aid of claim 8 wherein the right panels include a bottom right panel and remainder right panels; and in the folded position, the central section is flat and horizontal, the bottom right panel is flat and horizontal, and the remainder right panels are flat, horizontal and directly above the bottom right panel.

22. The cooking aid of claim 19 further comprising
- a right pleated section of the foil which extends from the front edge to the back edge, which comprises a plurality of right panels folded along longitudinal folds and which is expandable from a folded position in which the right edge is at a third location to an unfolded position in which the right edge is at a fourth location to the right of the third location; and
- a central section of the foil between the left and right pleated sections;
- wherein the right panels include a bottom right panel and remainder right panels; and in the folded position, the central section is flat and horizontal, the bottom right panel is flat and horizontal, and the remainder right panels are flat, horizontal and directly above the bottom right panel.

23. A cooking aid comprising:
- a piece of foil having front and back edges defining therebetween a longitudinal direction and left and right edges defining therebetween an axial direction; wherein the piece of foil is adapted for use in cooking a fowl in an oven; and
- a left pleated section of the foil which extends from the front edge to the back edge, which comprises a plurality of left panels folded along longitudinal folds and which is expandable from a folded position in which the left edge is at a first location to an unfolded position in which the left edge is at a second location in which the left edge in its entirety is to the left of the first location; and
- wherein the left panels include a longitudinally extending bottom left panel and remainder left panels extending in the longitudinal direction; and in the folded position, the longitudinally extending bottom left panel is flat and horizontal, and the remainder left panels are flat, horizontal and directly above the bottom left panel all extending in the longitudinal direction; and further comprising an additional section of the foil which is to the right of the left pleated section and is formed of a single thickness of the piece of foil; and a fluid drain hole formed in the additional section positioned beneath the fowl.

* * * * *